Nov. 4, 1969  A. R. GELLER  3,476,923

HIGH SPEED MULTI-INPUT ADDER

Filed Jan. 13, 1967

ENVIRONMENTAL SYSTEM

Nov. 4, 1969
A. R. GELLER
3,476,923
HIGH SPEED MULTI-INPUT ADDER
Filed Jan. 13, 1967
34 Sheets-Sheet 3
FIG. 3a
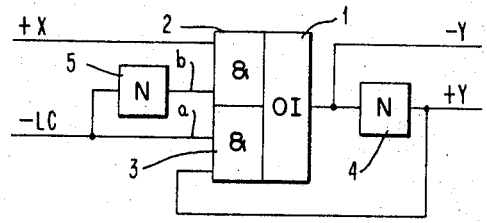
FIG. 3b
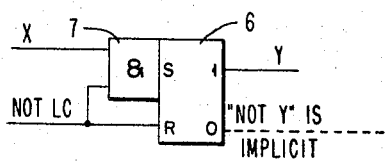
FIG. 3c
FIG. 3d
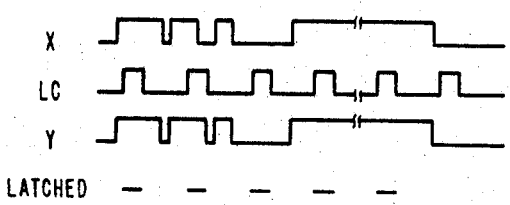
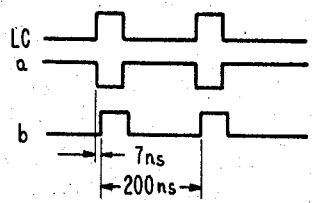
FIG. 4a
FIG. 4b
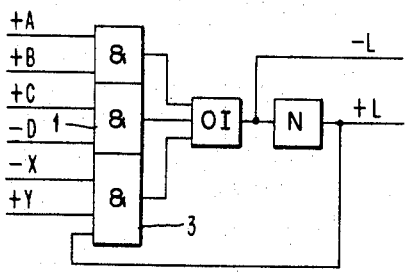
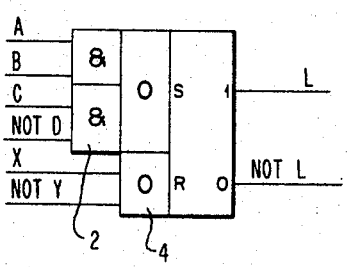
FIG. 5a
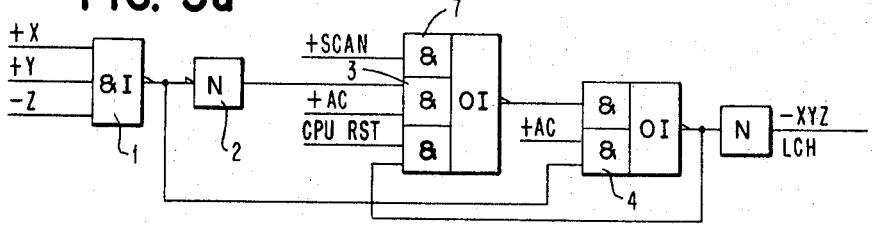
FIG. 5b
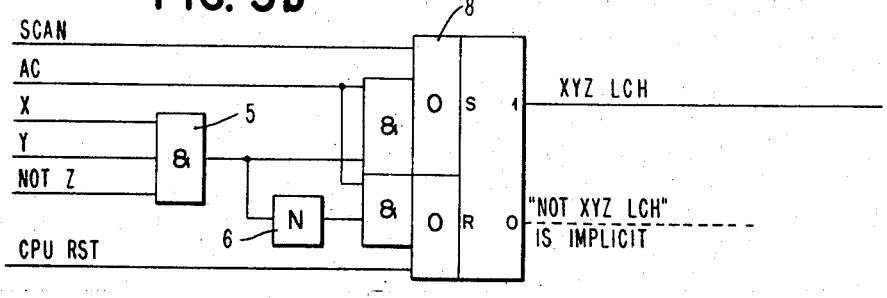

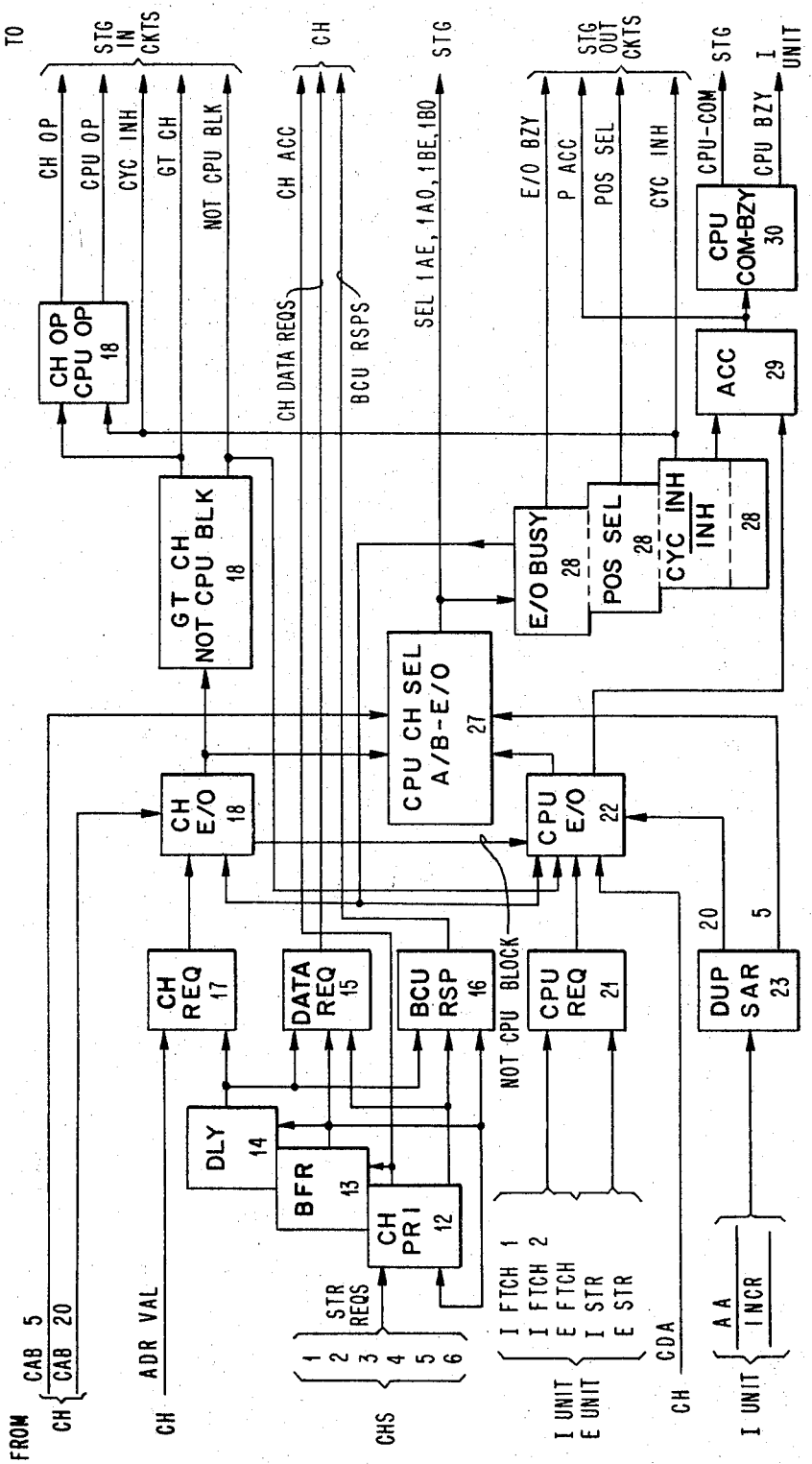

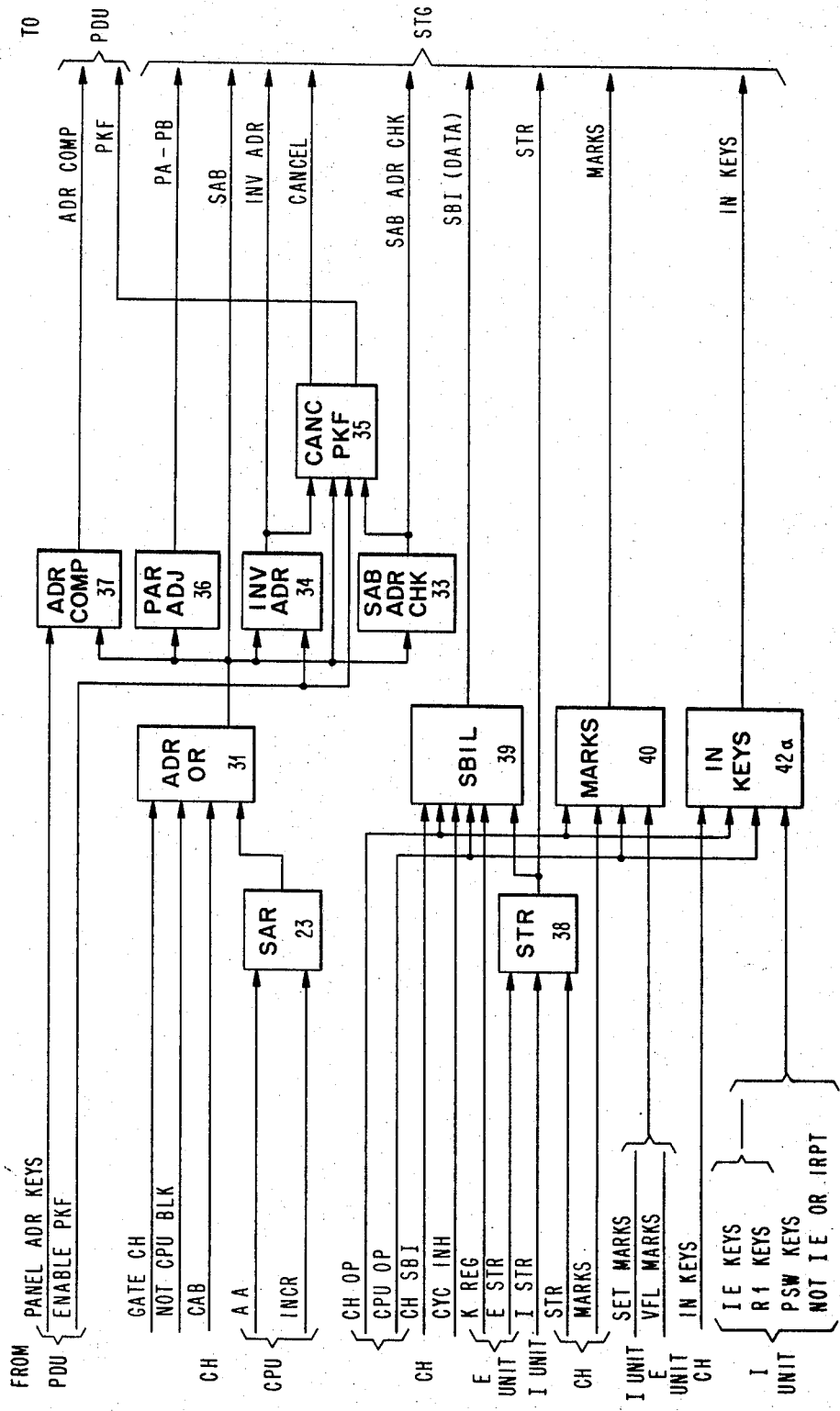

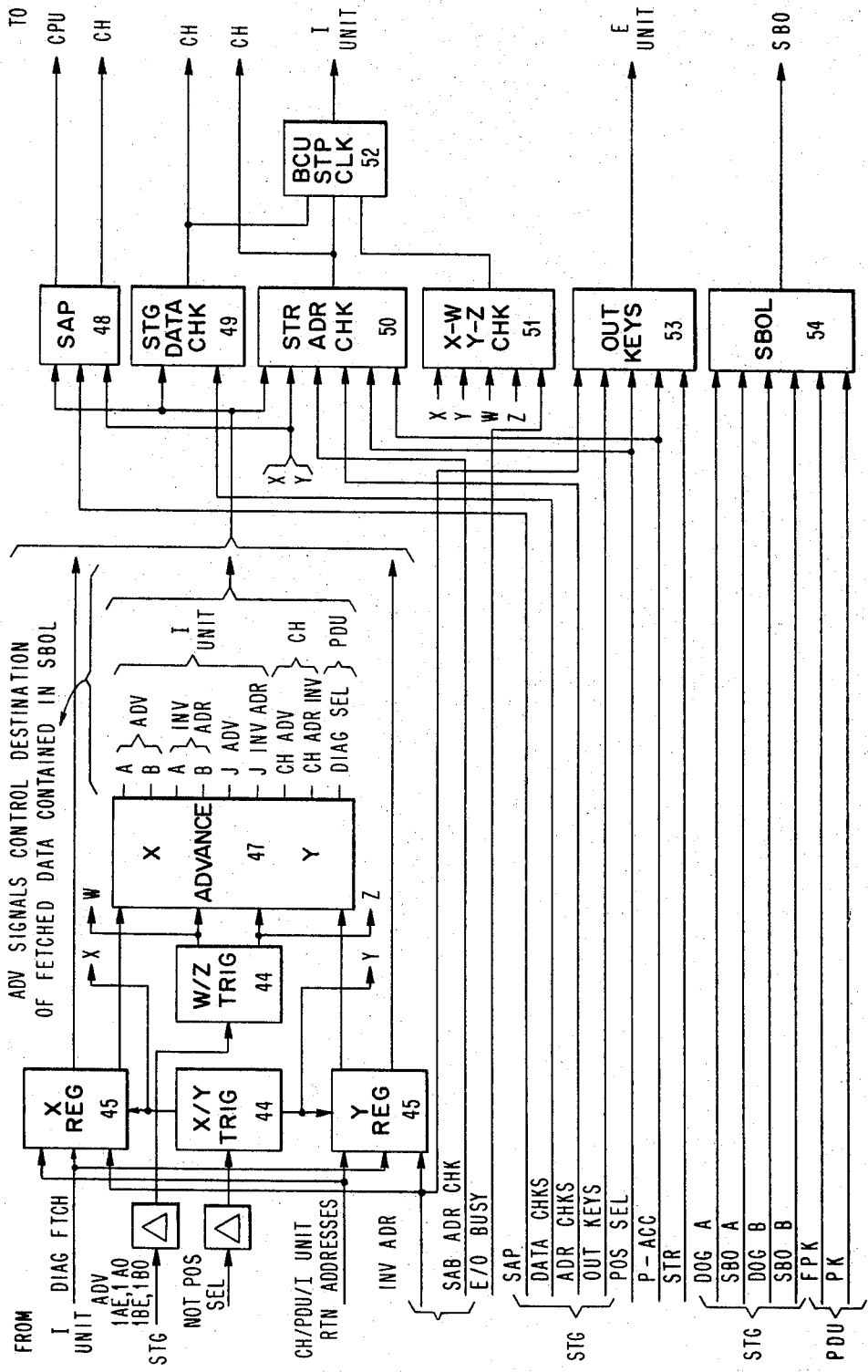

FIG.12

THRU

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

FIG.59

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

FIG. 61

THRU

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

FIG. 67

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

FIG. 68  I UNIT SCAN

Nov. 4, 1969            A. R. GELLER            3,476,923

HIGH SPEED MULTI-INPUT ADDER

Filed Jan. 13, 1967            34 Sheets-Sheet 12

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

FIG. 71

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

FIG. 73 E UNIT DATA FLOW (2)

I UNIT

FIG.76

THRU

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1937

FIG.162

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609, 238
FILED ON JANUARY 13, 1967

Nov. 4, 1969         A. R. GELLER         3,476,923
HIGH SPEED MULTI-INPUT ADDER
Filed Jan. 13, 1967
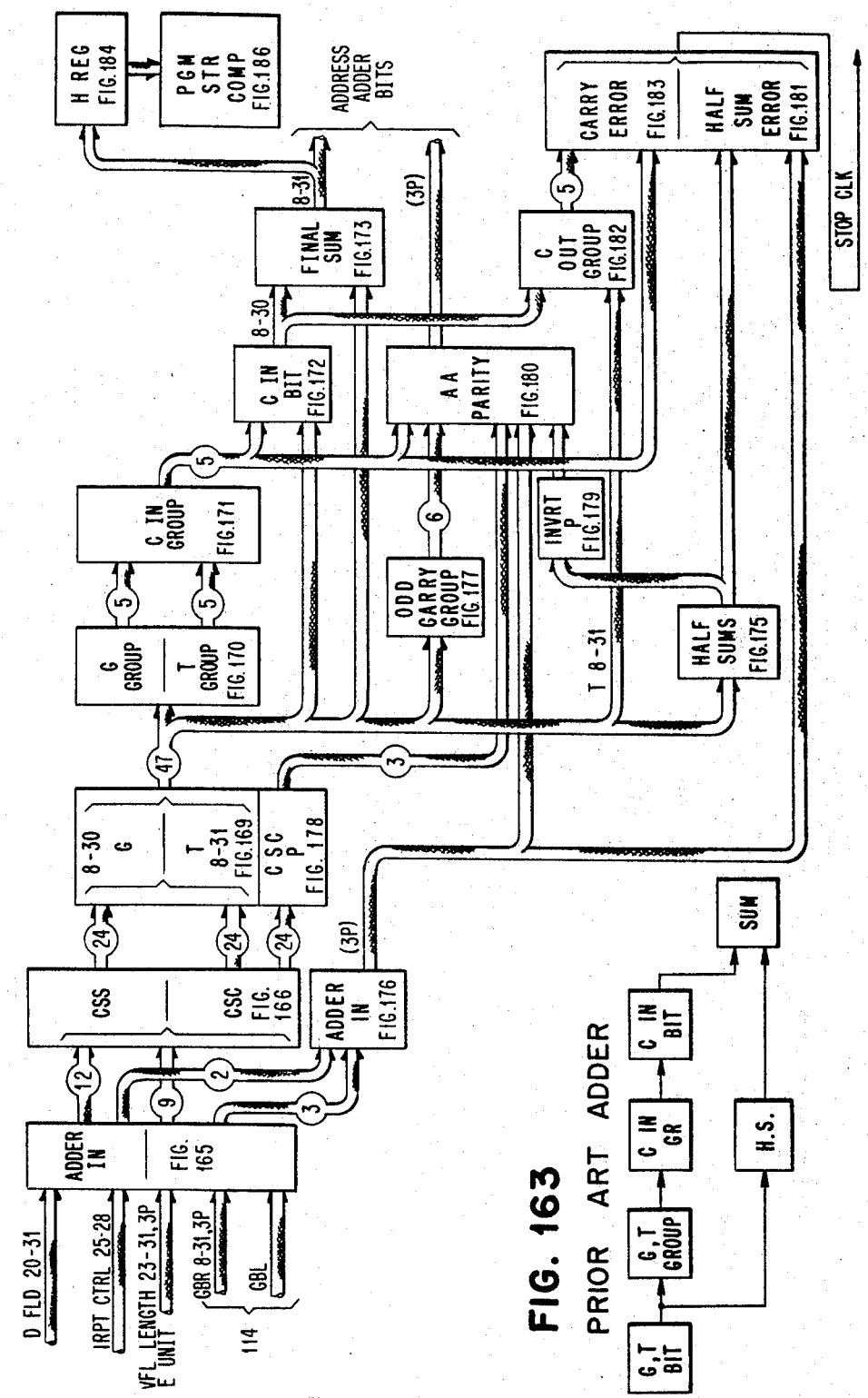
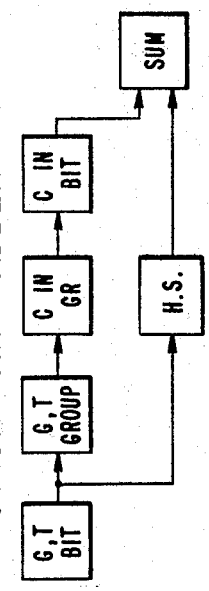

FIG. 165    ADDER INPUT
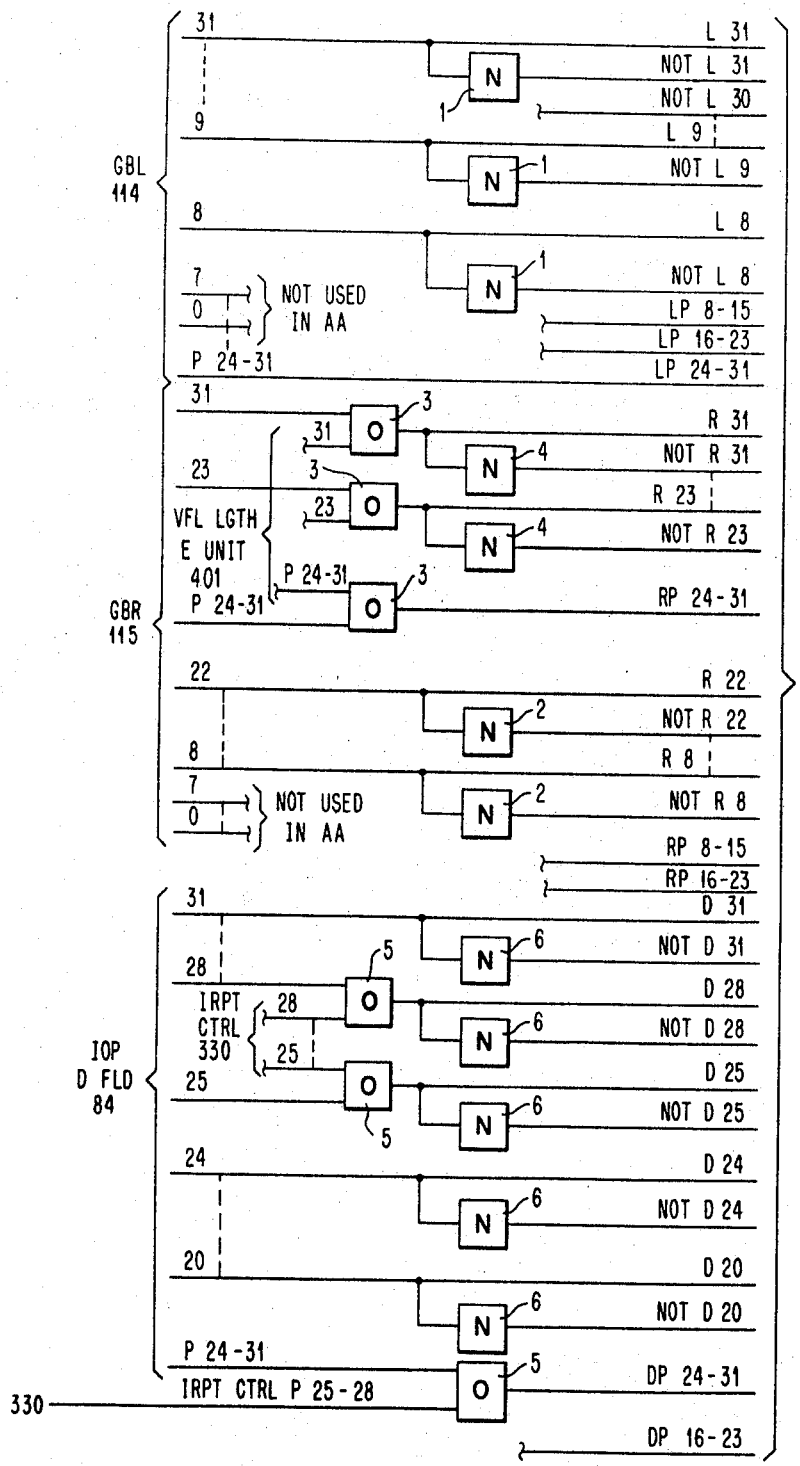

Nov. 4, 1969 — A. R. GELLER — 3,476,923
HIGH SPEED MULTI-INPUT ADDER
Filed Jan. 13, 1967 — 34 Sheets-Sheet 21
FIG. 166 CSS/CSC
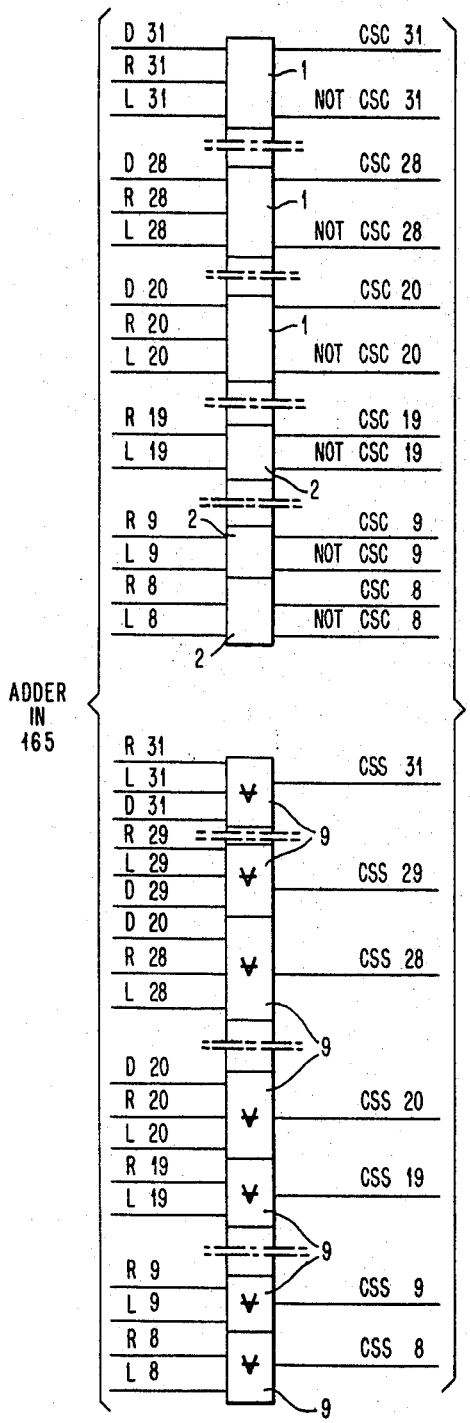
FIG. 166a
← CARRIES PROPAGATE TO LEFT
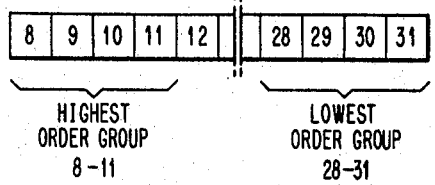
FIG. 167
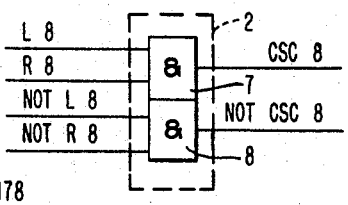
FIG. 168
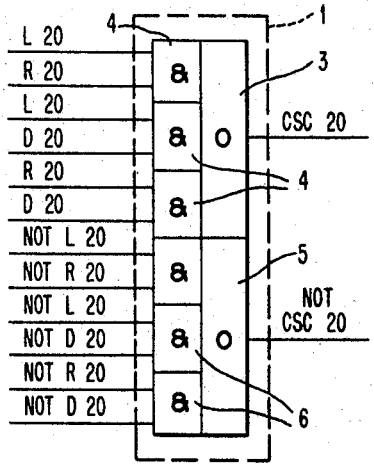

FIG. 169 BIT FUNCTIONS G-T

Nov. 4, 1969   A. R. GELLER   3,476,923
HIGH SPEED MULTI-INPUT ADDER
Filed Jan. 13, 1967   34 Sheets-Sheet 24

FIG. 171   C IN GROUP

Nov. 4, 1969  A. R. GELLER  3,476,923
HIGH SPEED MULTI-INPUT ADDER
Filed Jan. 13, 1967  34 Sheets-Sheet 25

Nov. 4, 1969　　　A. R. GELLER　　　3,476,923
HIGH SPEED MULTI-INPUT ADDER
Filed Jan. 13, 1967　　　　　　　　　　34 Sheets-Sheet 26
FIG. 173　　　FINAL SUM
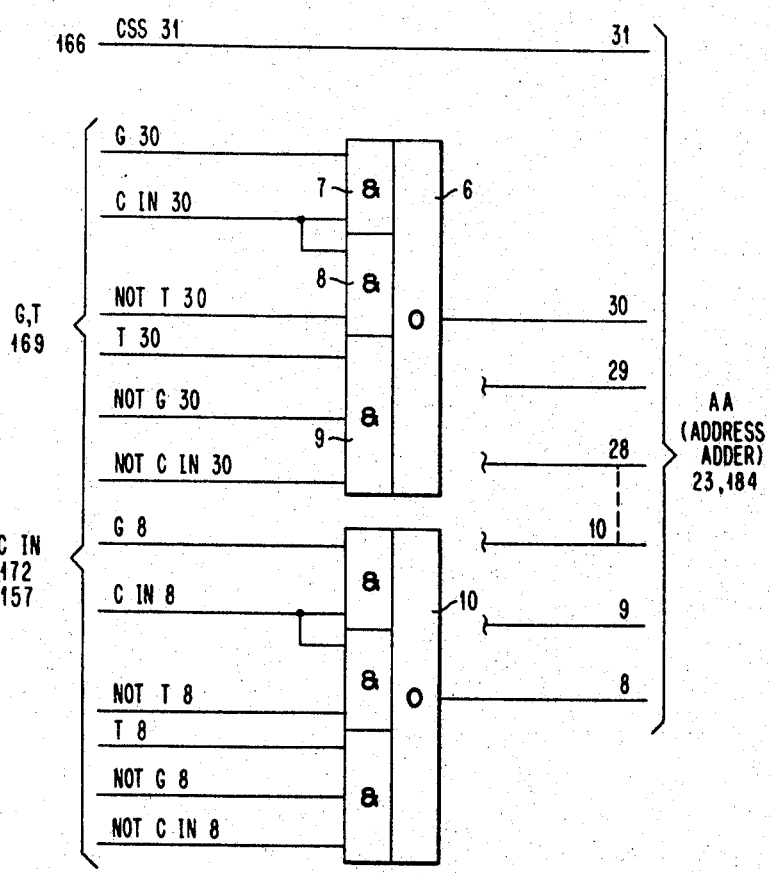
FIG. 174
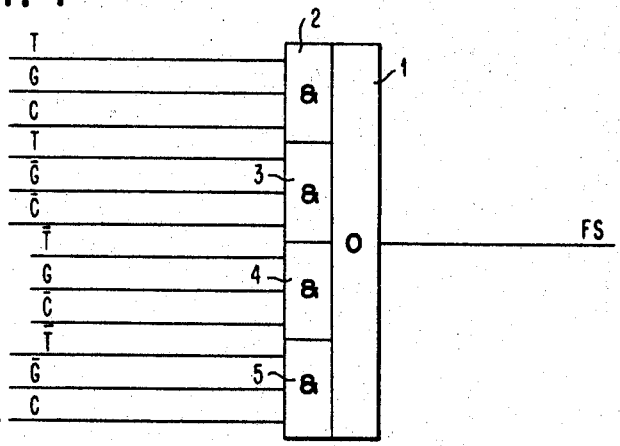

Nov. 4, 1969    A. R. GELLER    3,476,923
HIGH SPEED MULTI-INPUT ADDER
Filed Jan. 13, 1967    34 Sheets-Sheet 27
FIG. 175    HALF SUMS
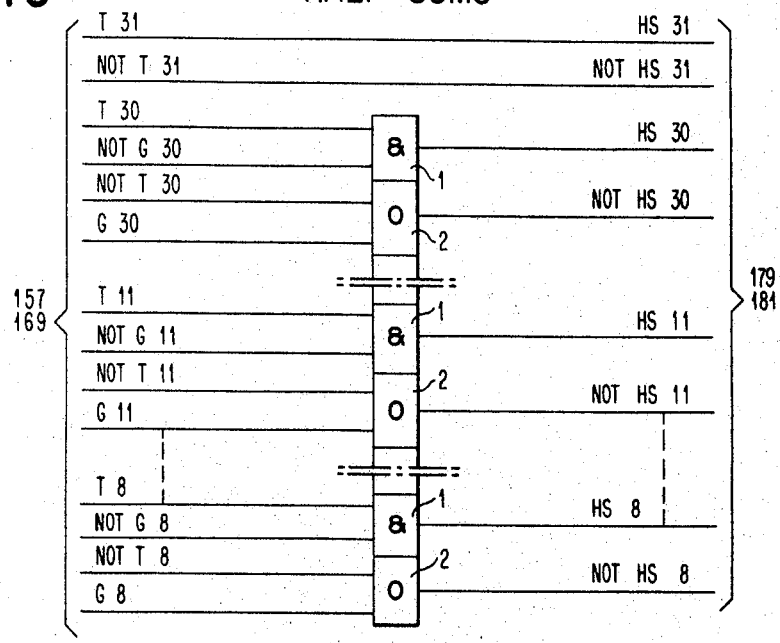
FIG. 176    ADDRESS ADDER INPUT PARITY
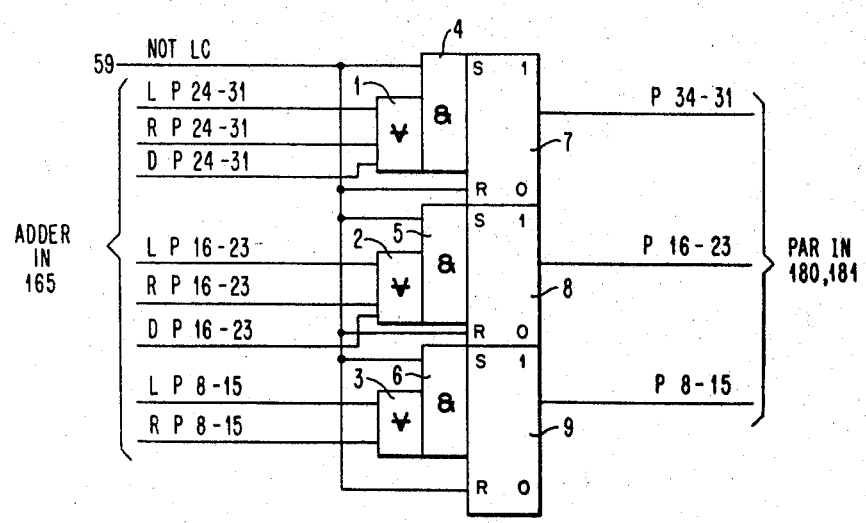

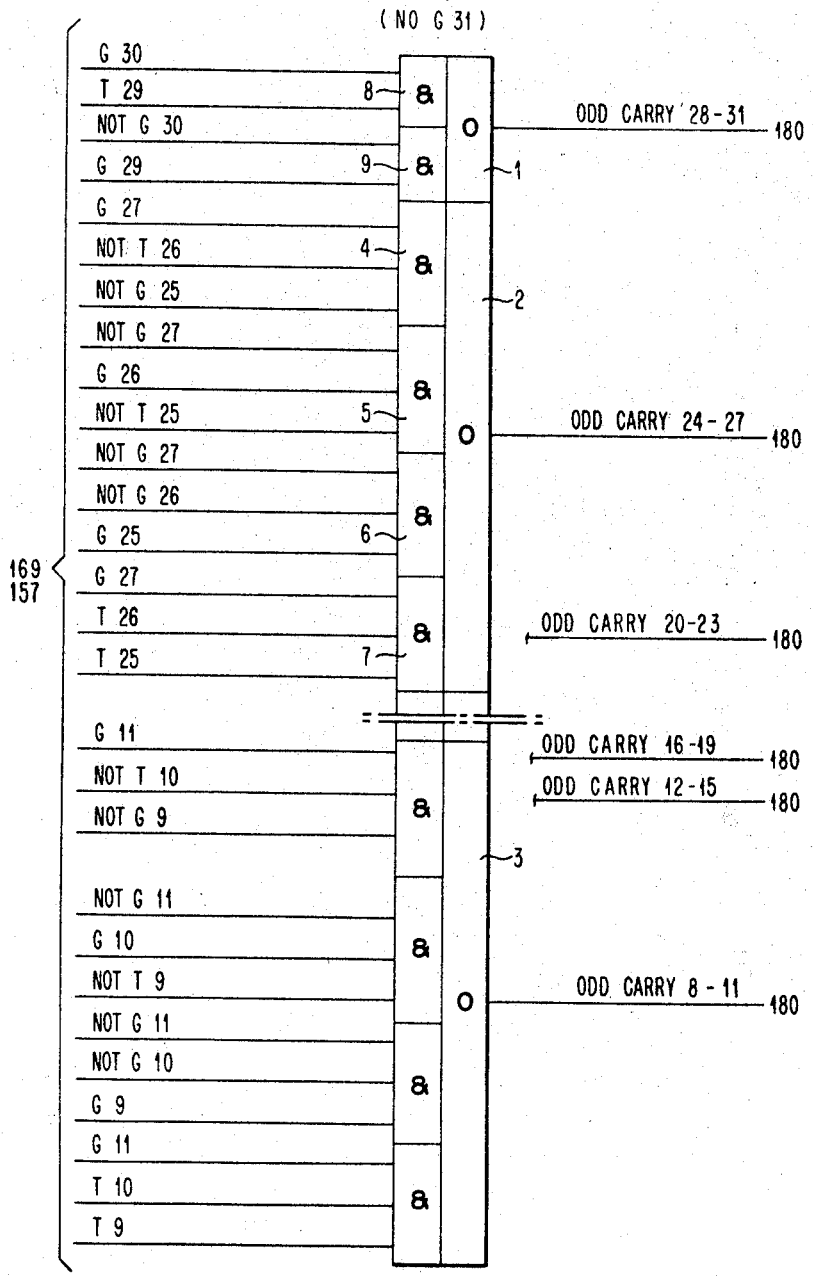
FIG. 177 ODD CARRY GENERATOR

FIG. 178 CARRY SAVE PARITY
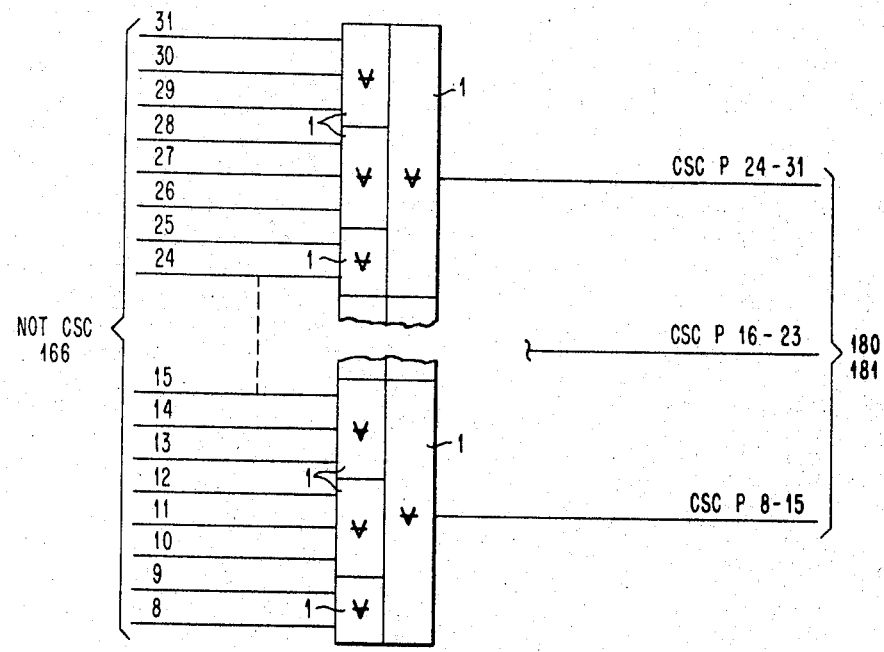
FIG. 179 PARITY INVERT
(NO C IN GROUP 28-31)
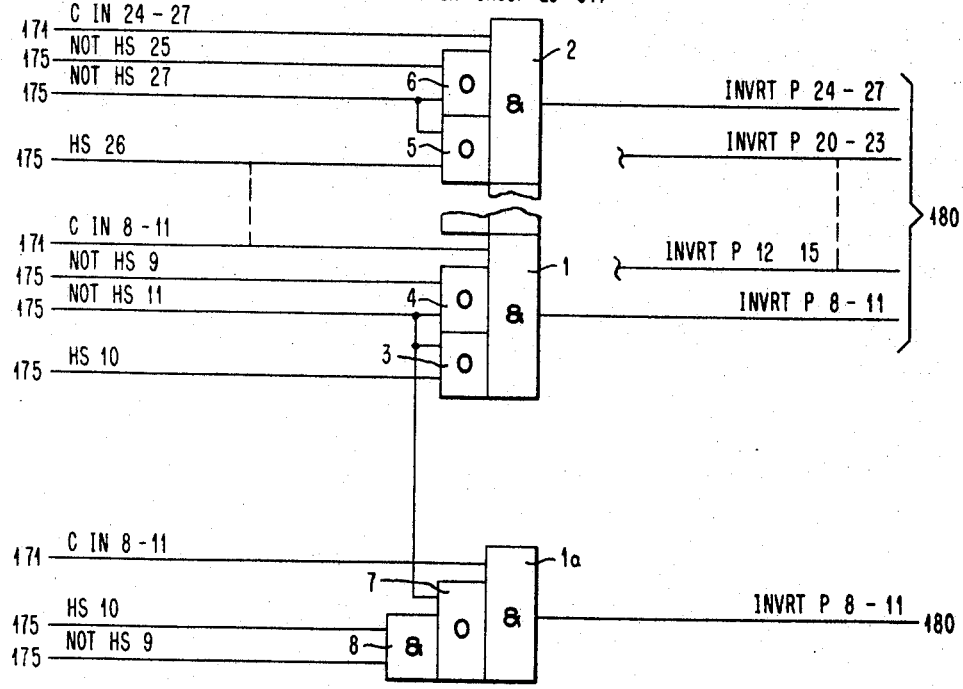

A A PARITY

Nov. 4, 1969　　　A. R. GELLER　　　3,476,923
HIGH SPEED MULTI-INPUT ADDER
Filed Jan. 13, 1967　　　　　　　　　　34 Sheets-Sheet 32

FIG. 182　　C OUT OF GROUP

CARRY ERROR AND AA STOP CLK

Nov. 4, 1969                A. R. GELLER                3,476,923
                        HIGH SPEED MULTI-INPUT ADDER
Filed Jan. 13, 1967                                34 Sheets-Sheet 34

FIG.184

THRU

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

FIG.876

THIS FIGURE IS ILLUSTRATIVE OF A
LIKE-NUMBERED FIGURE WHICH IS SHOWN
IN DETAIL IN SAID ENVIRONMENTAL SYSTEM,
LARGE SCALE DATA PROCESSING SYSTEM,
SERIAL NO. 609,238
FILED ON JANUARY 13, 1967

United States Patent Office 3,476,923
Patented Nov. 4, 1969

3,476,923
HIGH SPEED MULTI-INPUT ADDER
Alan R. Geller, Poughkeepsie, N.Y., assignor to International Business Machines Corporation, Armonk, N.Y., a corporation of New York
Continuation-in-part of application Ser. No. 445,321, Apr. 5, 1965. This application Jan. 13, 1967, Ser. No. 609,245
Int. Cl. G06f 5/02, 7/385, 7/42
U.S. Cl. 235—175                            10 Claims

ABSTRACT OF THE DISCLOSURE

The specification discloses an illustrative embodiment for the invention comprising a large scale data processing system of the type which is composed of a plurality of quasi-independent units. The environmental data processing system includes a central processing unit or portion, which is herein referred to as a CPU, a plurality of storage units, a plurality of input/output control devices referred to herein as channels, as well as control and maintenance facilities which are found in a power distribution unit, herein referred to as a PDU. The CPU of the environmental system includes a control or instruction unit hereinafter referred to as an I unit, and an arithmetic and logic or execution unit, hereinafter referred to as an E unit. The I unit includes controls for instruction fetching, branching, interruption handling, communication with the input/output channels, and other related functions. The E unit of the environmental system can perform algebraic and logical operations, moving, shifting, and other functions. Sums are provided at high speed by a carry propagate adder which takes its inputs from the outputs of a carry save adder. Elements of both adders are utilized in predicting and checking the parity of the sum.

This application is a continuation-in-part of application Ser. No. 445,321, filed Apr. 5, 1965 now abandoned, entitled High-Speed Multi-Input Adder."

TABLE OF CONTENTS

Figure 2:
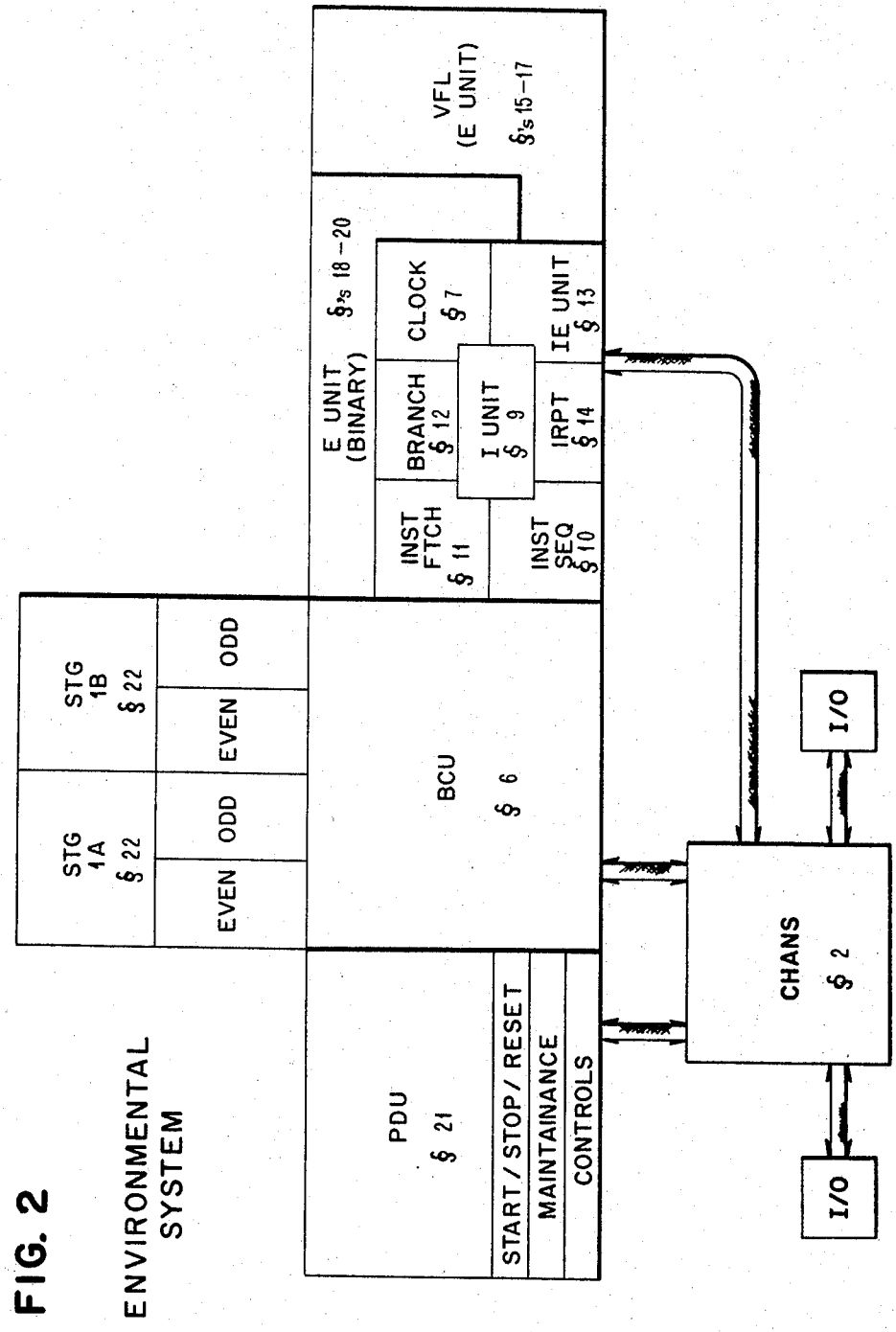
Figure 68:
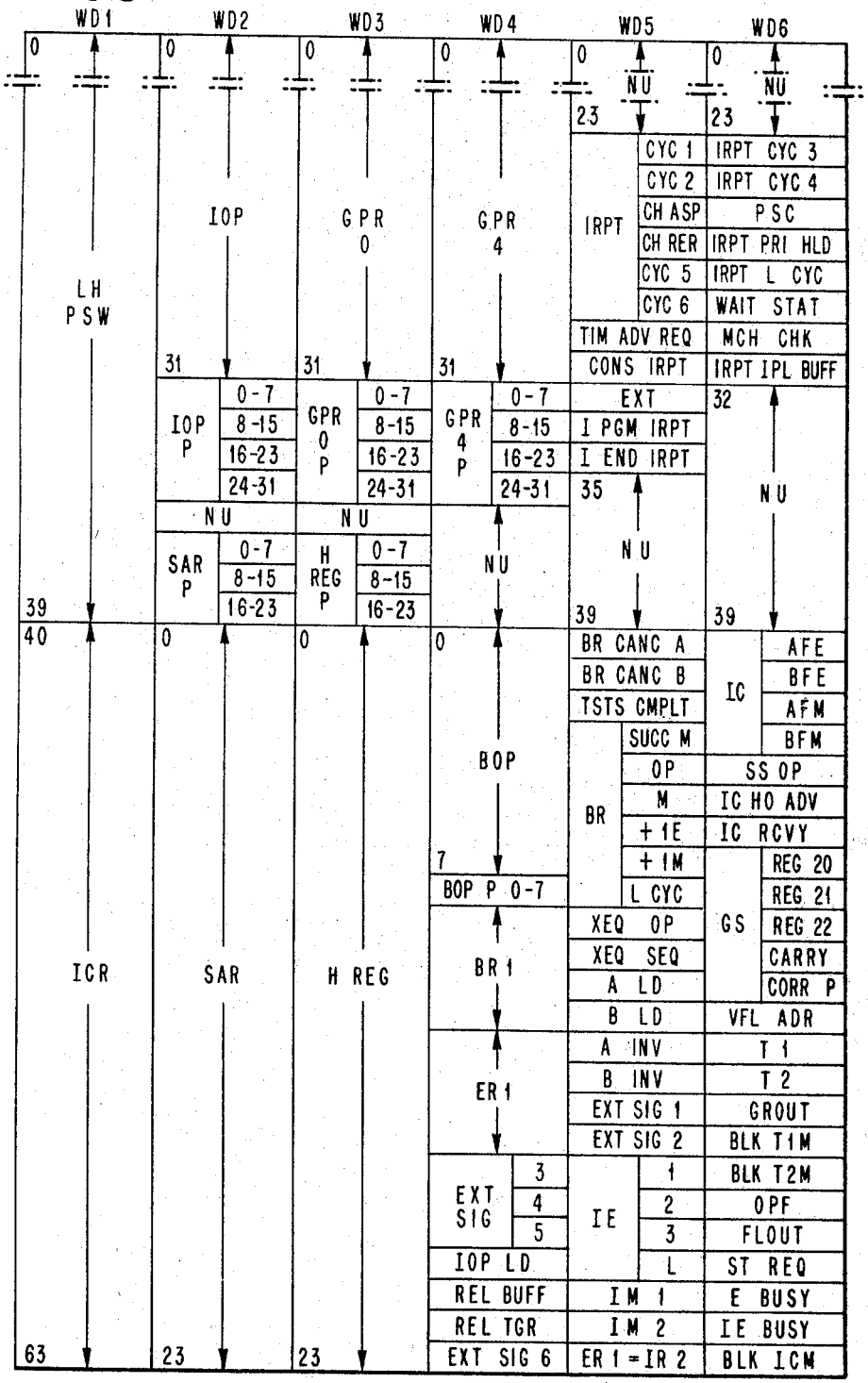
Figure 72:
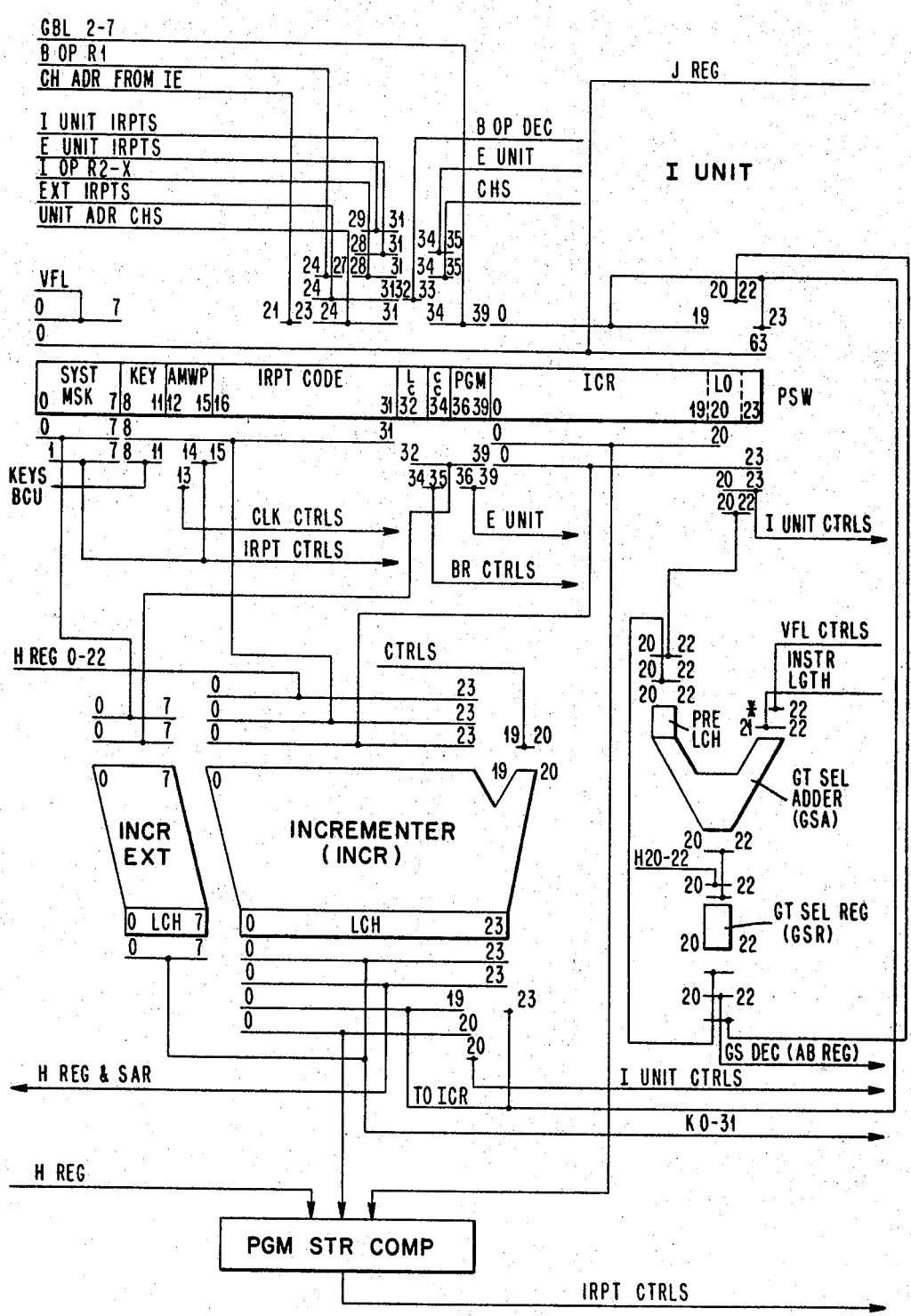
Figure 73:
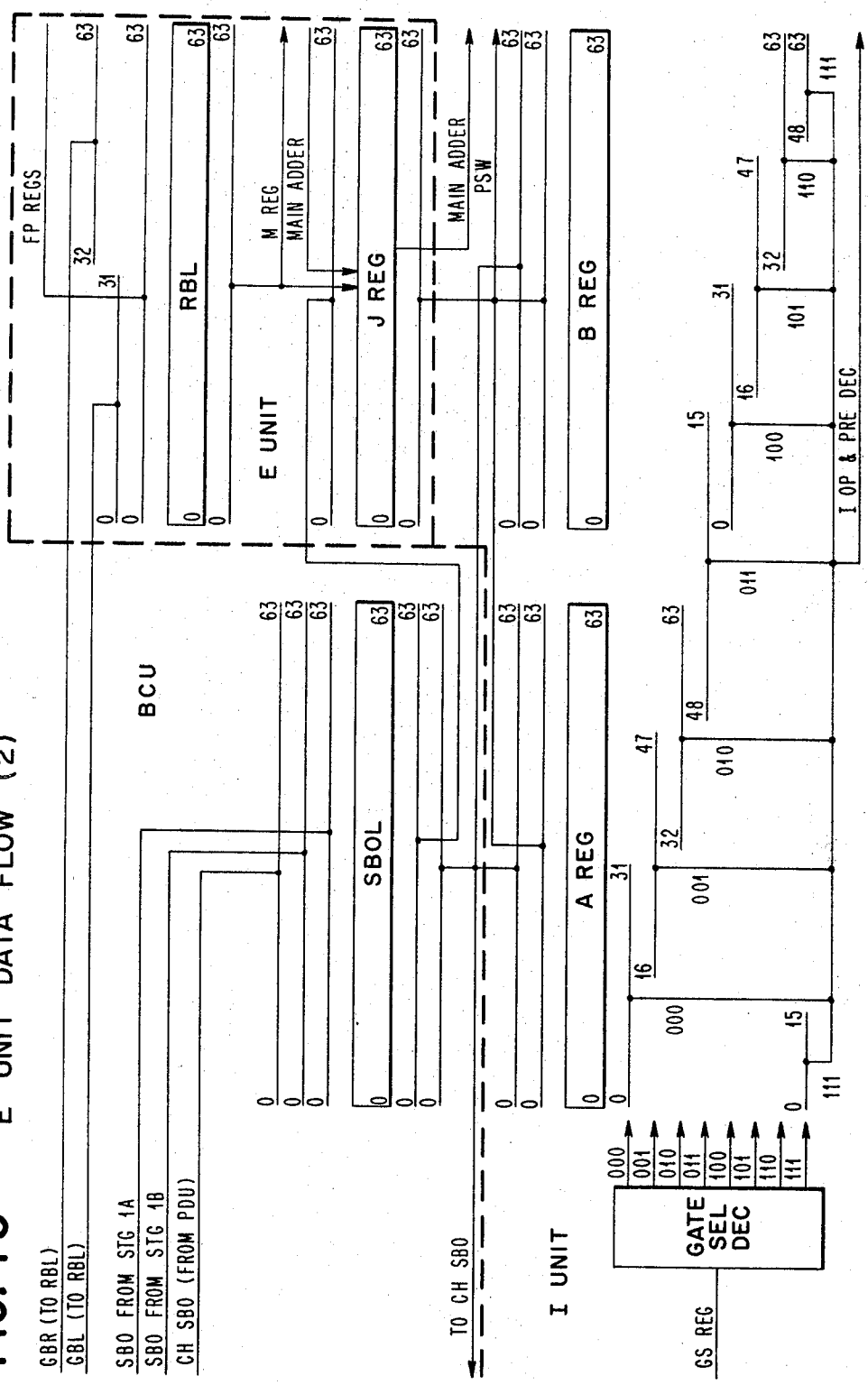
Figure 74:
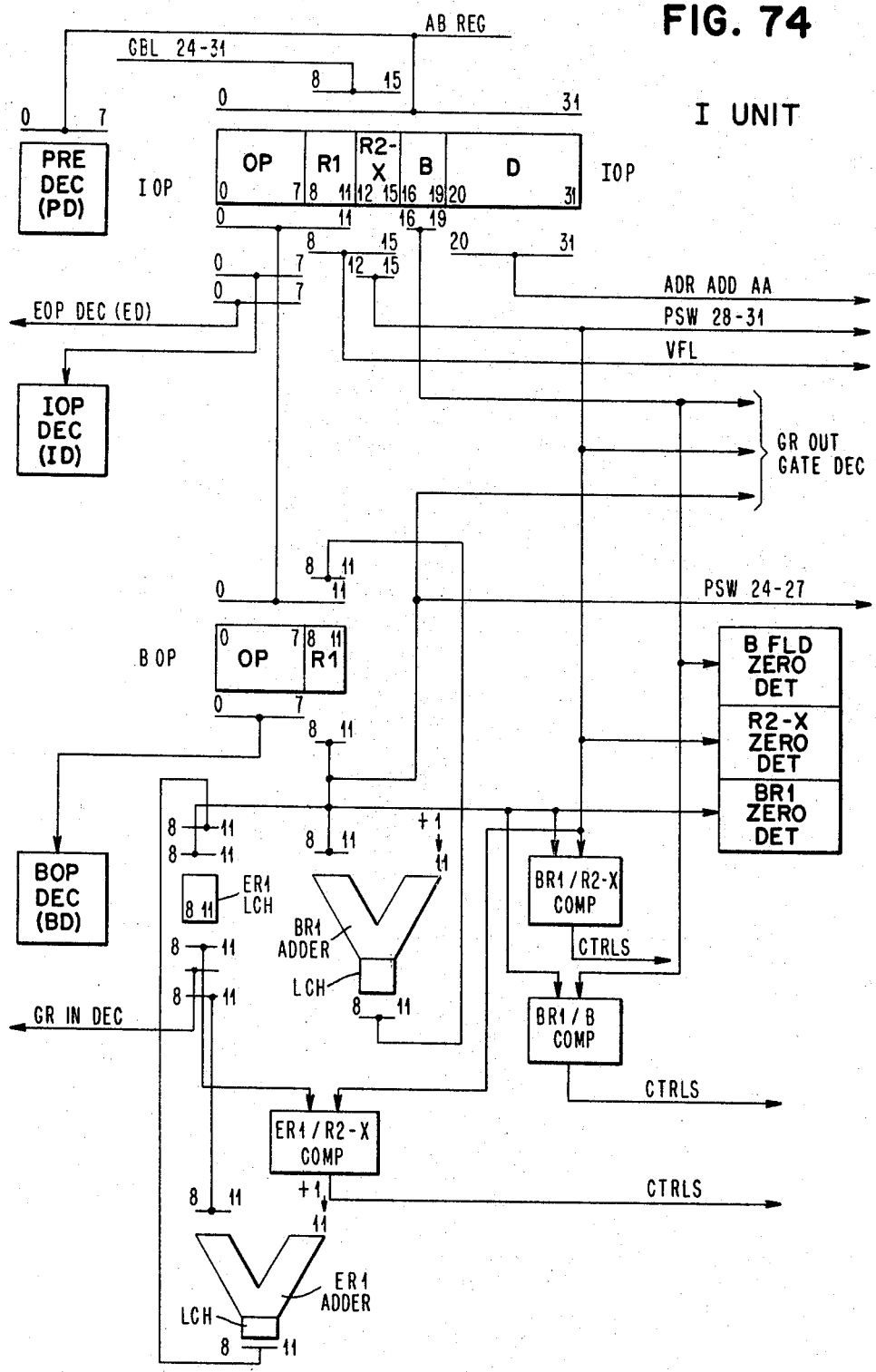
Figure 75:
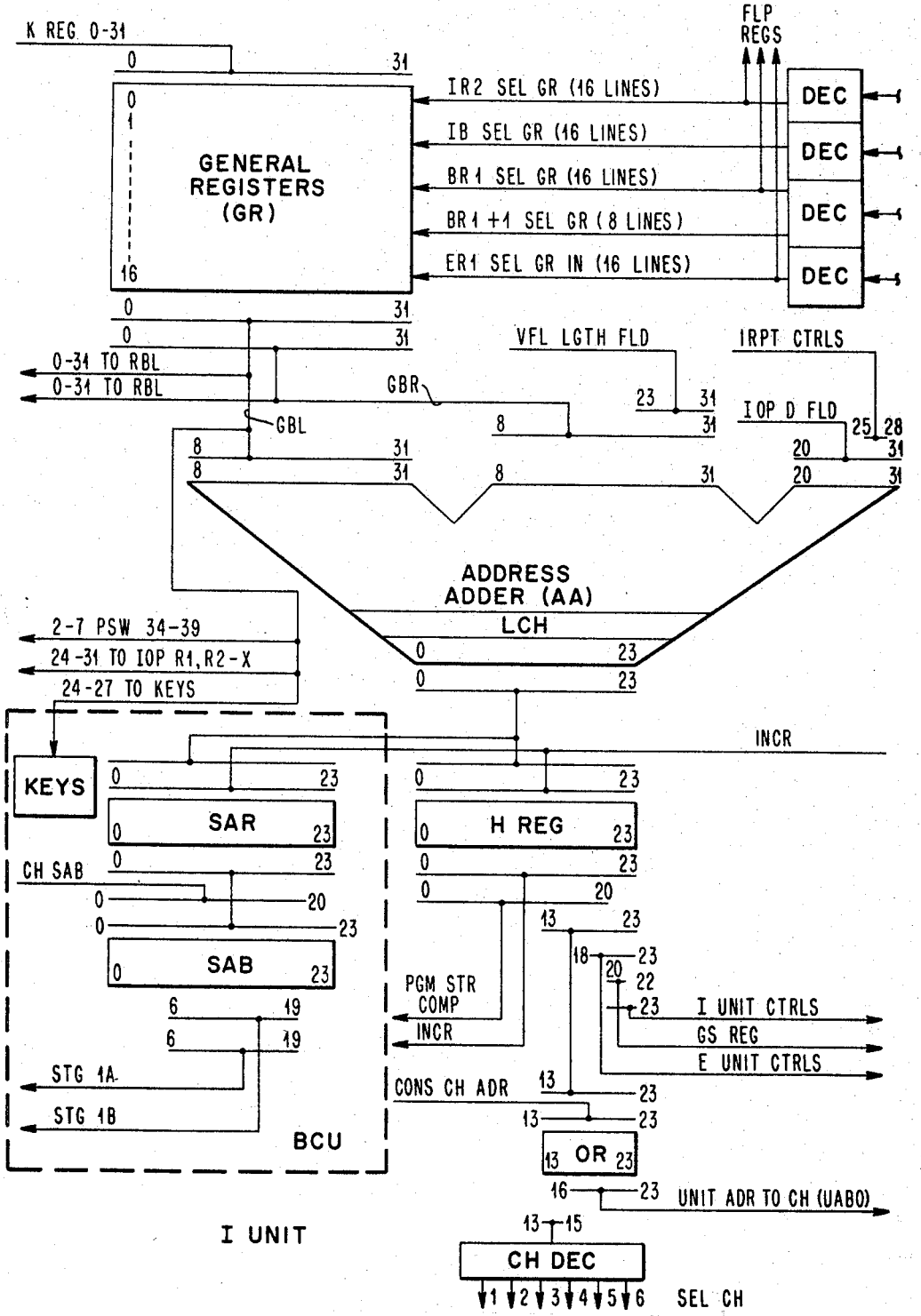
Figure 169:
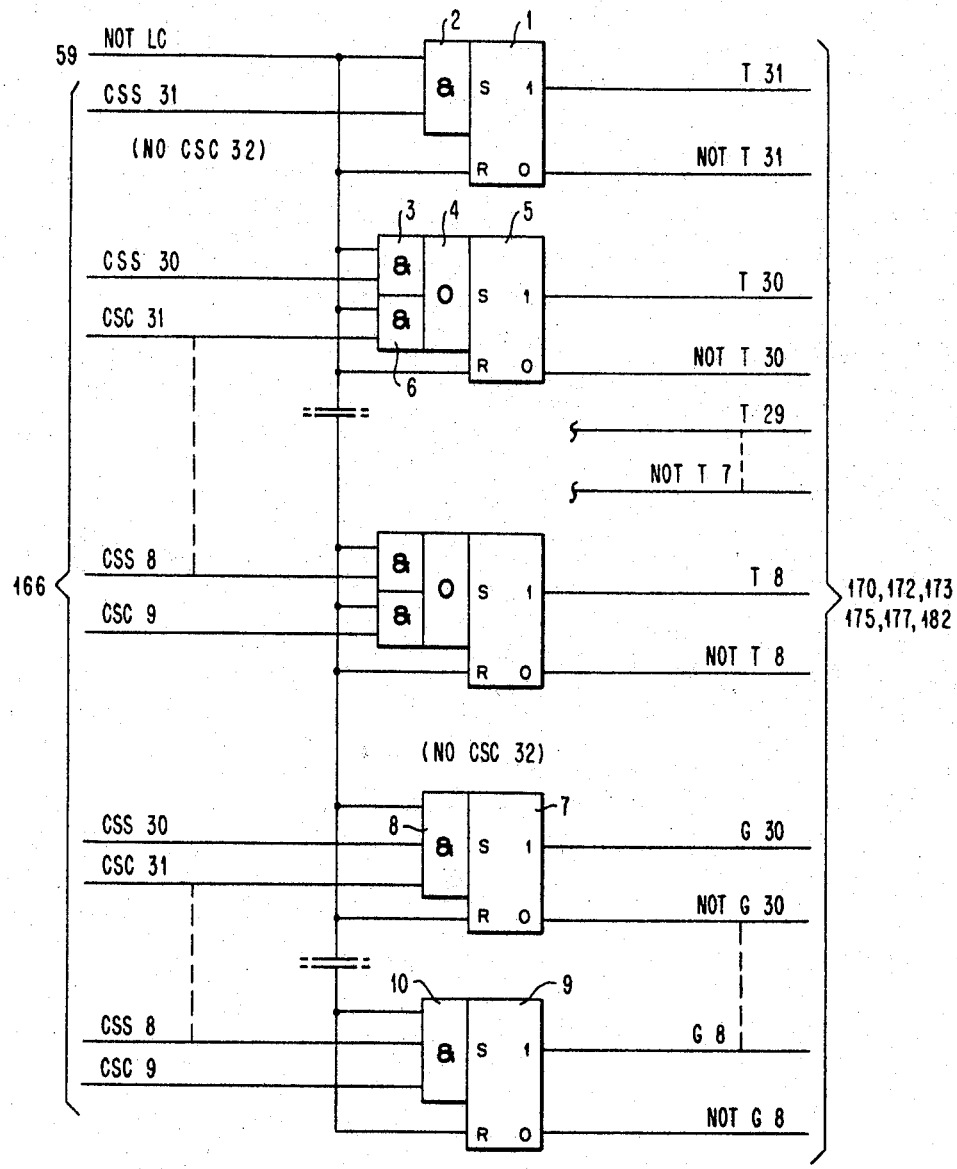
Figure 170:
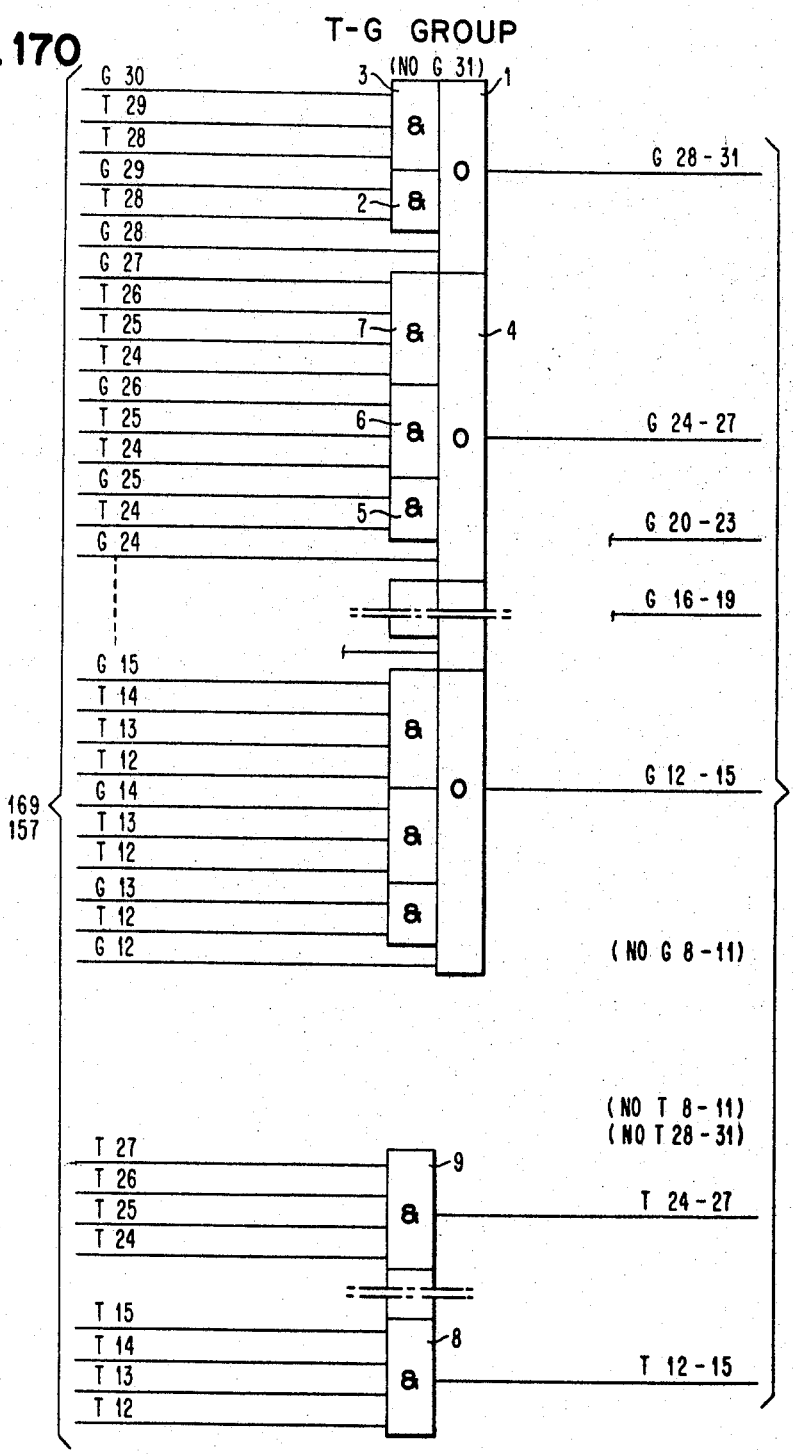
Figure 171:
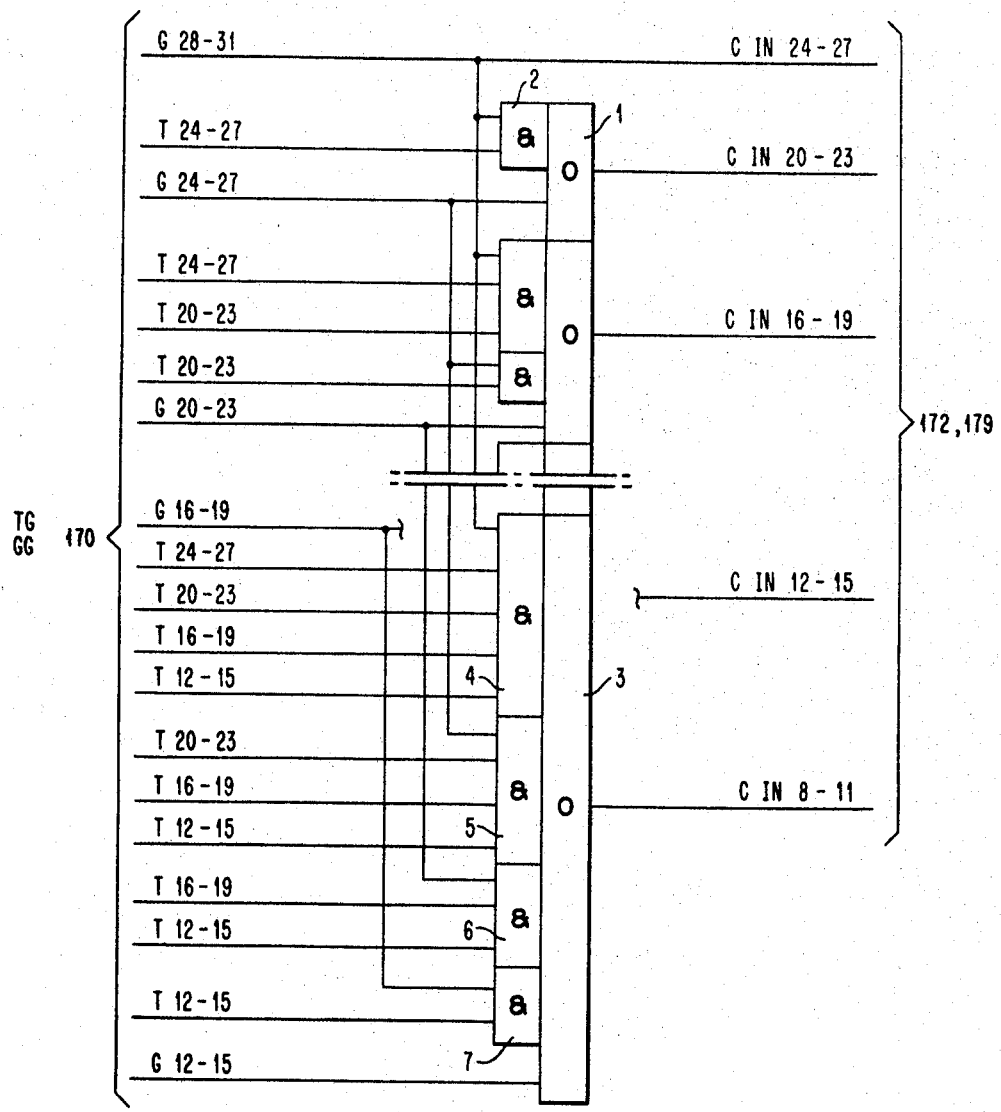
Figure 172:
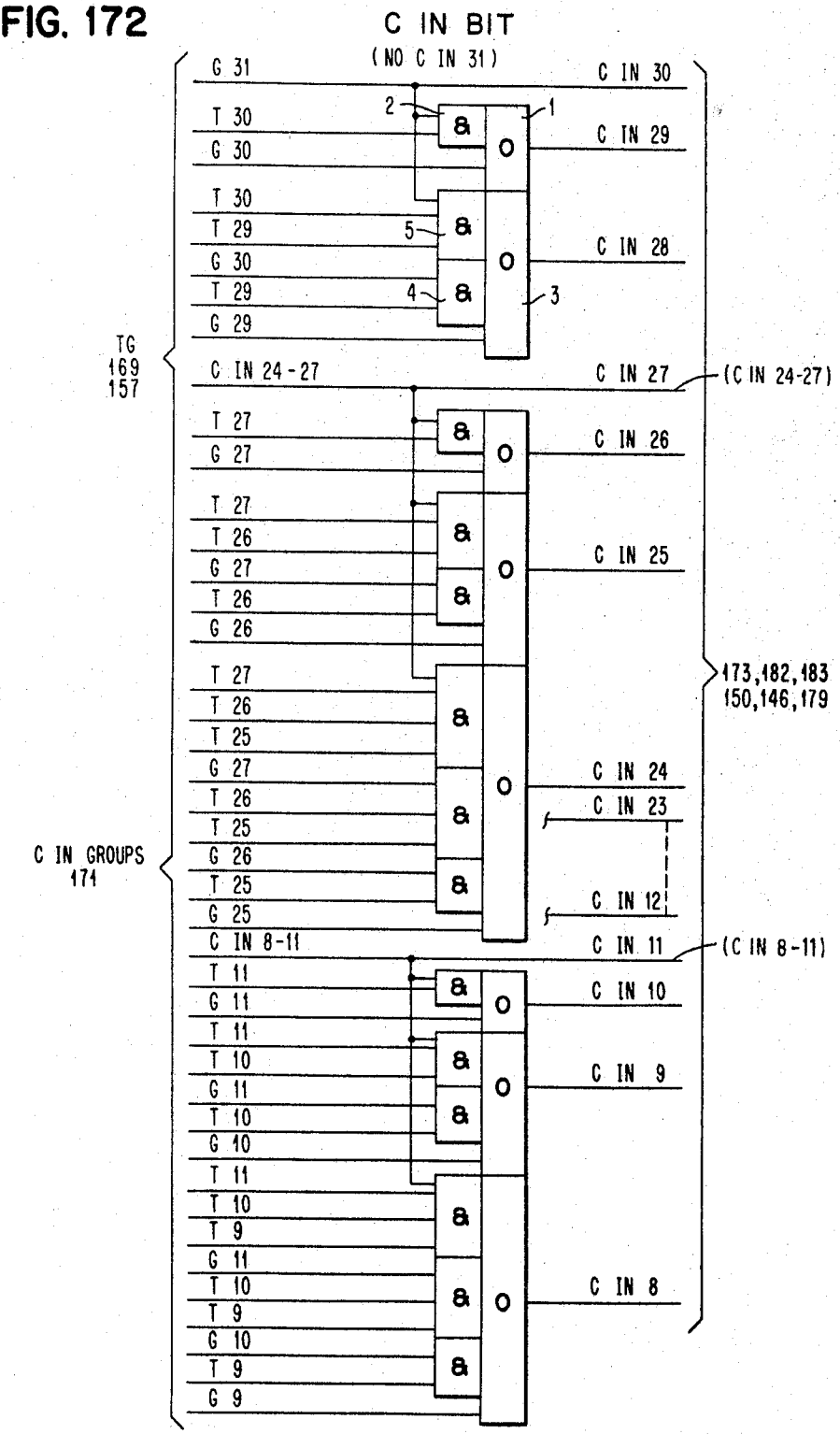
Figure 180:
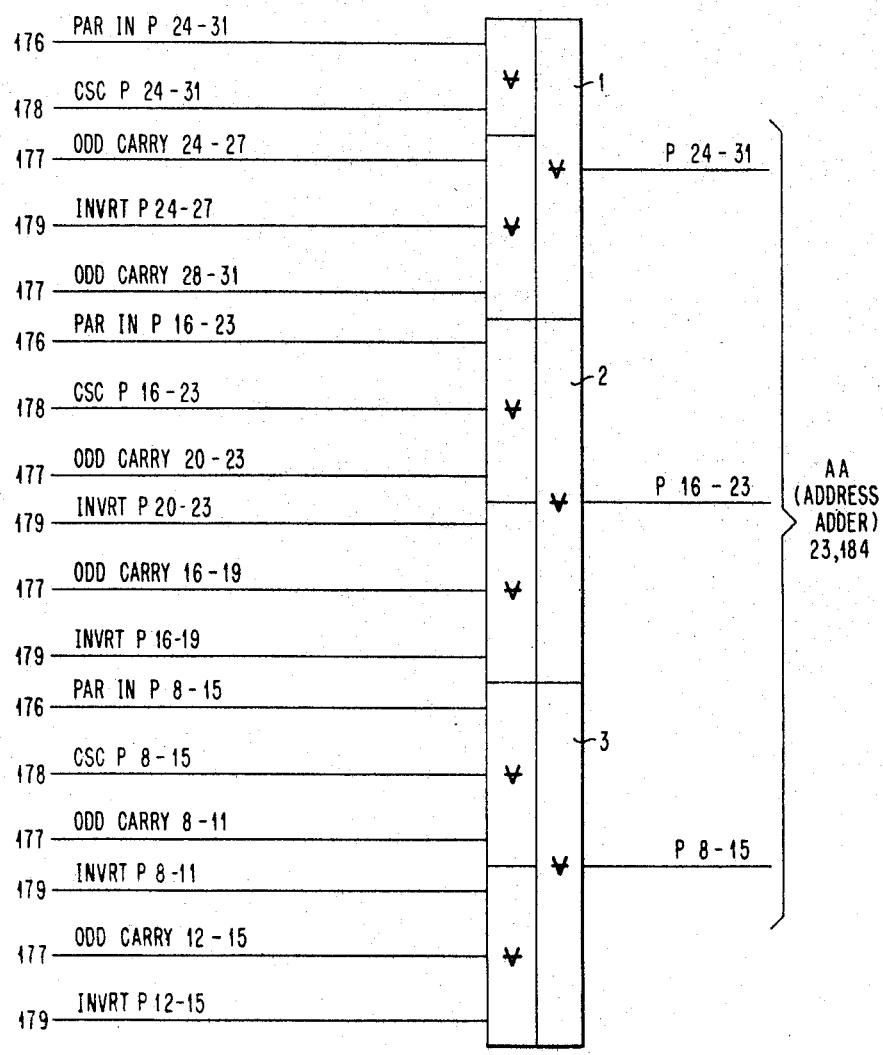
Figure 181:
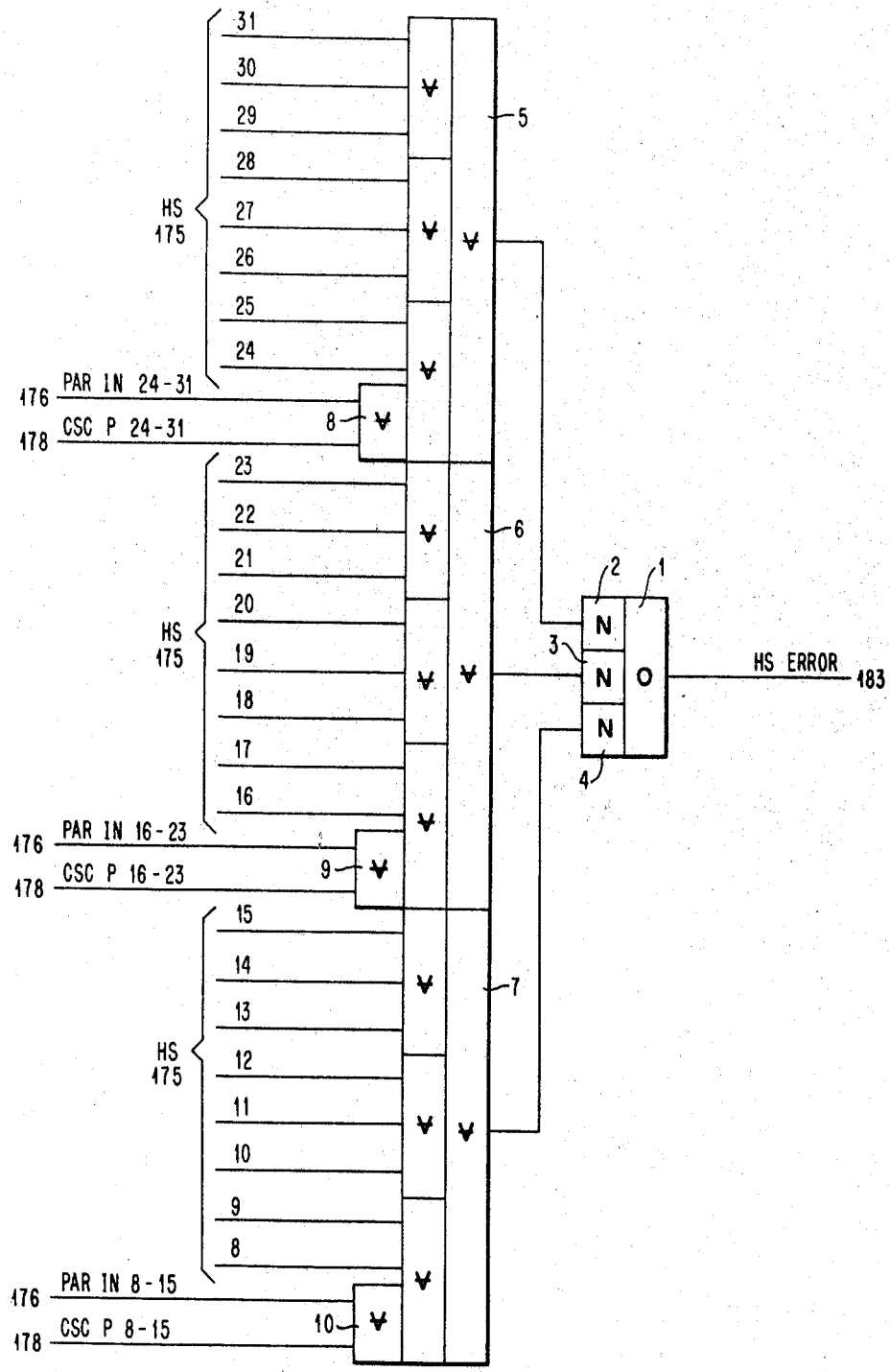
Figure 182:
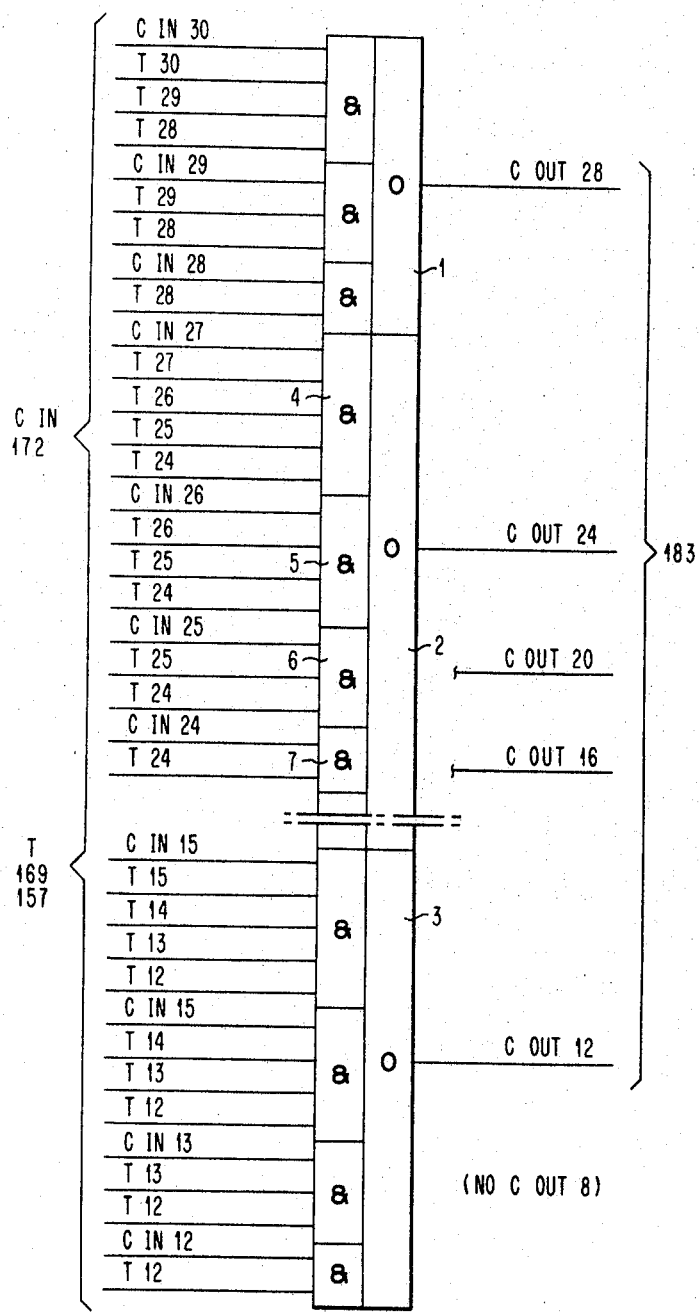
Figure 183:
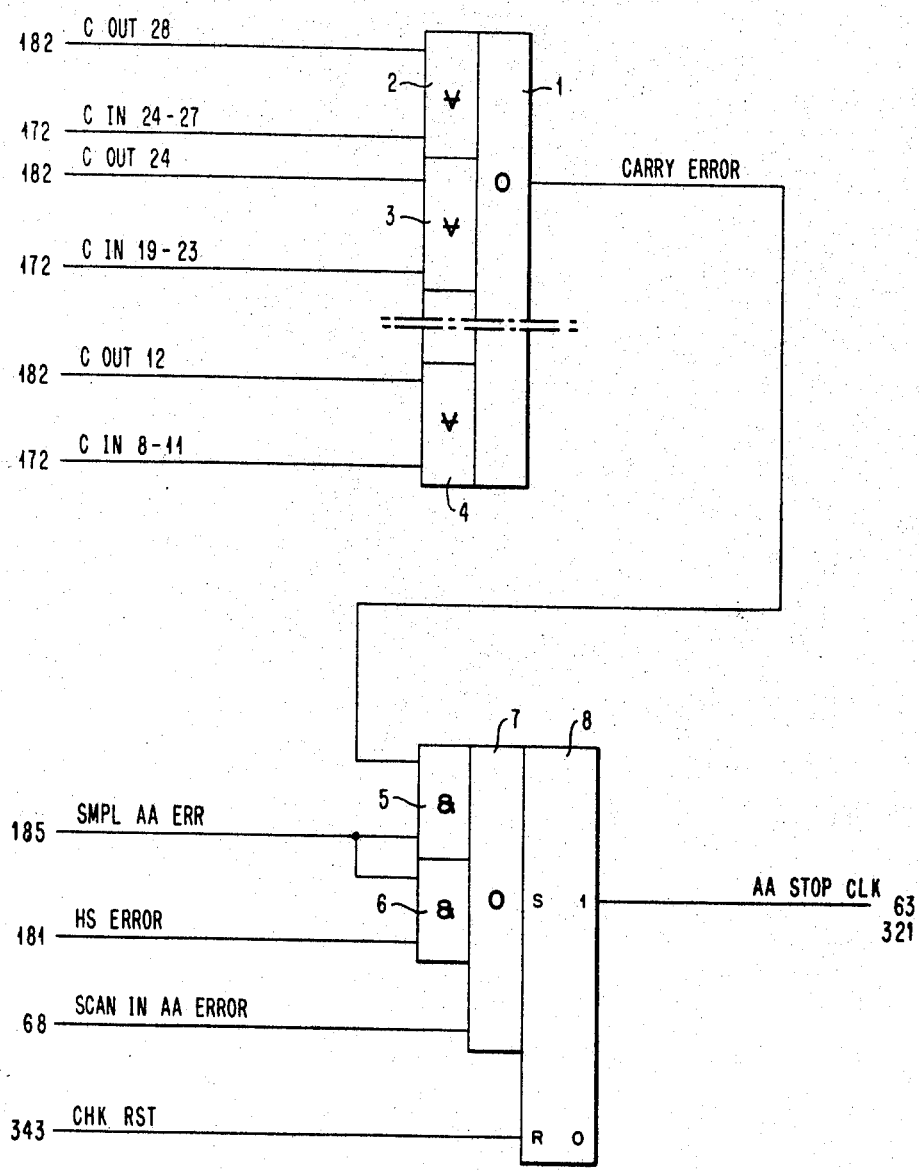

| | Column |
|---|---|
| 1.0 Background of the Invention | 2 |
| 2.0 References | 3 |
| 3.0 Nomenclature | 4 |
| 4.0 Brief Description of Environmental System FIG. 2 | 6 |
| 5.0 Component Circuits FIG. 3 Through FIG. 8 | 6 |
| 6.0 Basic Bus Control Unit | 8 |
| 7.0 Clock Circuit | 9 |
| 7.4 Clock Circuit FIG. 59 | 9 |
| 8.0 Scan | 9 |
| 8.1 Scanning Into the I Unit FIG. 68 | 10 |
| 8.2 Scanning Into the E Unit FIG. 69 | 10 |
| 9.0 Instruction Unit Data Flow | 10 |
| 9.1 General Introduction To I Unit Data Flow | 11 |
|   9.1.1 Instruction Selection FIG. 72 | 11 |
|   9.1.2 Instruction Input Paths FIG. 73 | 12 |
|   9.1.3 Instruction Decoding FIG. 74 | 12 |
|   9.1.4 Instruction Utilization FIG. 75 | 13 |
| 9.3 Address Adder | 13 |
|   9.3.1 Brief Description FIG. 164 | 13 |
|   9.3.2 Input Section | 14 |
|     9.3.2.1 Adder Input Circuit FIG. 165 | 14 |
|     9.3.2.2 Carry Save Sum and Carry Circuits FIG. 166 through FIG. 168 | 14 |
|   9.3.3 Sum Generating Section | 15 |
|     9.3.3.1 Generate And Transmit Functions FIG. 169 | 15 |
|     9.3.3.2 Group Transmit And Generate Circuits FIG. 170 | 15 |
|     9.3.3.3 Carry Into Group Circuit FIG. 171 | 16 |
|     9.3.3.4 Carry Into Bit FIG. 172 | 16 |
|     9.3.3.5 Final Sum Generating Circuit FIG. 173 | 17 |
|   9.3.4 Parity Generating Circuits FIG. 176 Through FIG. 180 | 18 |
|     9.3.4.1 Address Adder Input Parity FIG. 176 | 19 |
|     9.3.4.2 Half Sum Generator FIG. 175 | 19 |
|     9.3.4.3 Odd Carry Generator FIG. 177 | 19 |
|     9.3.4.4 Carry Save Parity Circuit FIG. 178 | 20 |
|     9.3.4.5 Parity Invert Circuit FIG. 179 | 20 |
|     9.3.4.6 Address Adder Parity FIG. 180 | 21 |
|   9.3.5 Adder Checking Circuits FIG. 181 Through FIG. 183 | 22 |
|     9.3.5.1 Carry Out Of Group FIG. 182 | 22 |
|     9.3.5.2 Half Sum Error Circuit FIG. 181 | 22 |
|     9.3.5.3 Carry Error And Addressing Adder Stop Clock Circuit FIG. 183 Circuit FIG. 183 | 23 |
|     9.3.5.4 Address Adder Outgating FIG. 185 | 23 |

TABLE OF FIGURES

Figure 1:
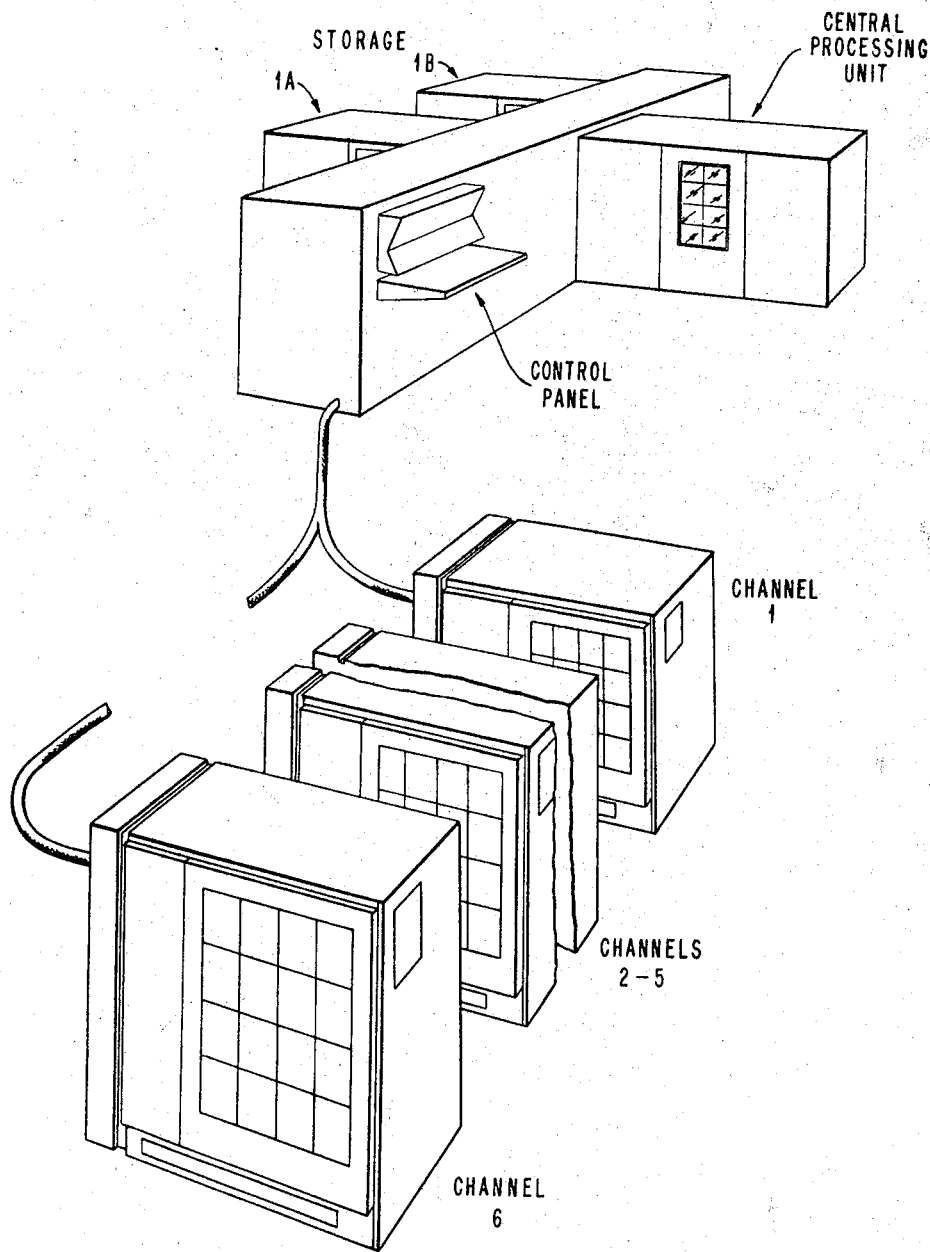
Figure 60:
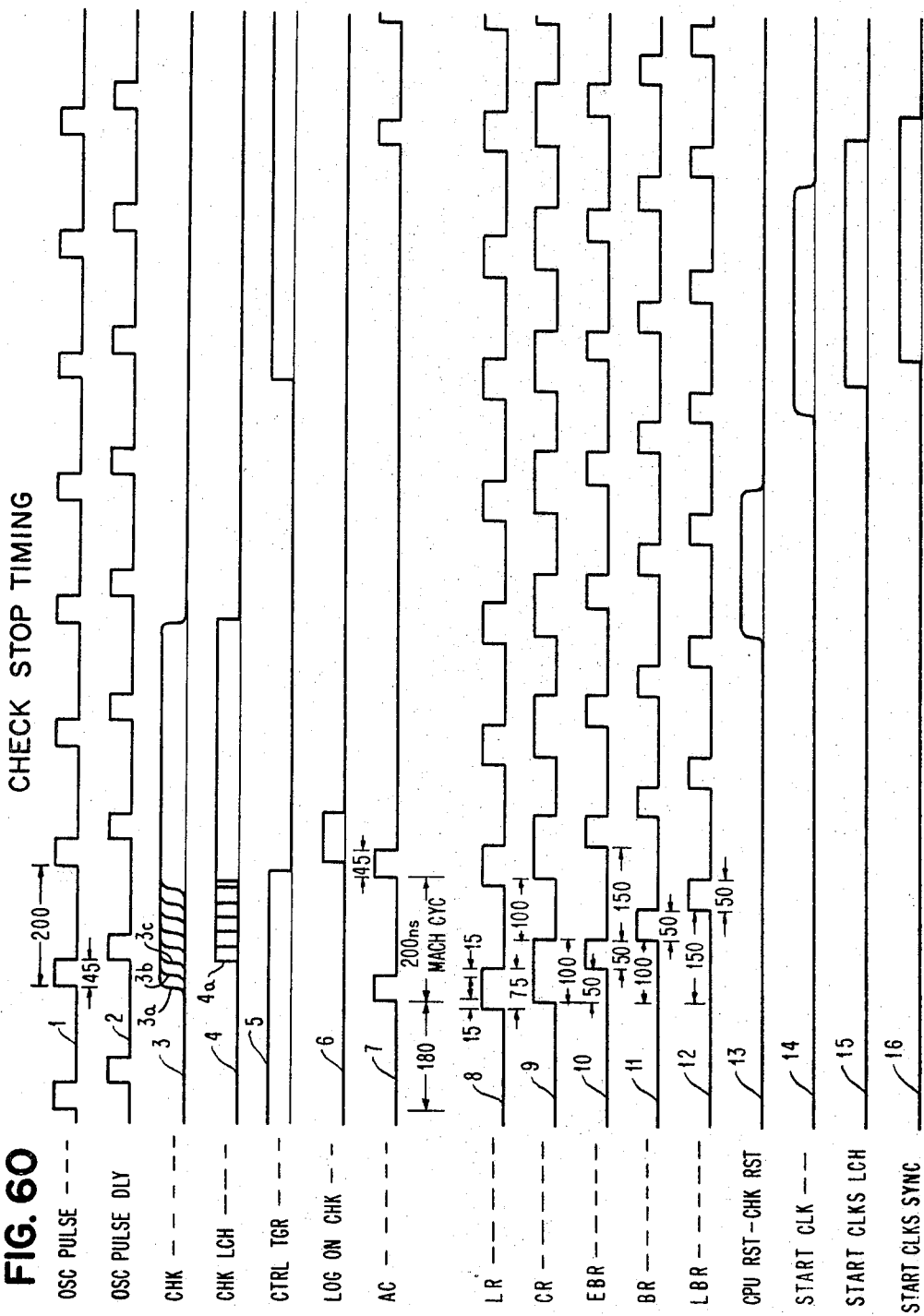

| | Sheet |
|---|---|
| FIG. 1 System Illustration | 1 |
| FIG. 2 Environmental System | 2 |
| FIG. 3a-5b Component Circuits | 3 |
| FIG. 6a-8b Component Circuits | 4 |
| FIG. 9 Selection Circuits | 5 |
| FIG. 10 Storage Input Circuits | 6 |
| FIG. 11 Storage Output Circuits | 7 |
| FIGS. 12-59 are illustrative of said environmental system | 8-38 |
| FIG. 60 Check Stop Timing | 39 |
| FIGS. 61-67 are illustrative of said environmental system | 40-43 |
| FIG 68 I Unit Scan | 44 |
| FIGS. 69 E Unit Scan | 45 |
| FIGS. 70-71 are illustrative of said environmental system | 46-47 |
| FIG. 72 E Unit Data Flow (1) | 48 |
| FIG. 73 E Unit Data Flow (2) | 49 |
| FIG. 74 I Unit | 50 |
| FIG. 75 GR + ADR | 51 |
| FIGS. 76-162 are illustrative of said environmental system | 52-111 |
| FIG. 163 Prior Art Adder | 112 |
| FIG. 164 Address Adder | 112 |
| FIG. 165 Adder Input | 113 |
| FIGS. 166-168 CSS/CSC | 114 |
| FIG. 169 Bit Functions G-T | 115 |
| FIG. 170 T-G Group | 116 |
| FIG. 171 C in Group | 117 |
| FIG. 172 C in Bit | 118 |
| FIGS. 173-174 Final Sum | 119 |
| FIG. 175 Half Sums | 120 |
| FIG. 176 Address Adder Input Parity | 120 |
| FIG. 177 Odd Carry Generator | 121 |
| FIG. 178 Carry Save Parity | 122 |
| FIG. 179 Parity Invert | 122 |
| FIG. 180 AA Parity | 123 |
| FIG. 181 Half Sum Error | 124 |
| FIG. 182 C Out of Group | 125 |
| FIG. 183 Carry Error and AA Stop Clk | 126 |
| FIGS. 184-876 are illustrative of said environmental system | 127-643 |

1.0 BACKGROUND OF THE INVENTION

This invention relates to data processing, and more particularly to a high speed multiple input adder.

In the data processing art, carry propagate adders have been developed so as to provide correct sums at very high speed. The development of these adders for two inputs (such as adding A to B) are well known. However, carry propagate adders developed for adding more than two inputs (such as for adding A and B and C concurrently) are very complex, and costly. In other words, provision of a carry propagate adder with more than two inputs is achieved only at a cost and a degree of complexity which is out of proportion with the additional inputs provided thereto.

An object of the present invention is to provide an improved high speed multiple input adder.

Other objects of the invention include:

Provision of a fully checked high speed multiple input adder;

Provision of a high speed multiple input adder having a relatively fast yet simple means for predicting parity;

Provision of a high speed multiple input adder having more than two inputs with small additional costs and hardware; and Provision of an improved high speed adder with parity prediction and checking facility.

In accordance with the present invention, a carry propagate adder is utilized to provide final sums at high speeds; this carry propagate adder has as its input the outputs from a carry save adder; since the carry save adder will readily combine more than two inputs into a carry save carry and a carry save sum, the carry save adder permits use of a two input carry propagate adder for generating the sum.

In further accord with the present invention, elements of the carry propagate adder and of the carry save adder are utilized in predicting the parity of the final sum of the carry propagate adder.

In accordance with other features of the invention, checking of the elements of the final sum and of the parity prediction is provided; this checking is in response to input signals, signals from the carry save adder, and signals generated within the carry propagate adder.

This invention permits the provision of high speed carry propagate addition for more than two inputs with only a relatively small addition to the amount of hardware involved, whereby costly multiple input carry propagate adder circuitry is avoided. The invention further provides for high speed parity prediction and for the checking of all of the elements of the final sum and of the final parity, thereby achieving all the advantages of relatively high cost carry propagate adders of the type used when more than two inputs are required without the high cost and large amount of hardware attendant thereto.

The foregoing and other objects, features and advantages of the present invention will become more apparent in the light of a detailed description of an illustrative embodiment thereof as shown in the accompanying drawings.

The drawings are illustrative block diagrams, schematic block diagrams, timing diagrams, charts and illustrations of an embodiment of the present improvement, as set forth in a Large Scale Data Processing System which is referred to as "said environmental system," as set forth in the table of figures:

2.0 REFERENCES

A primary reference in understanding the full environment of the present invention is an architectural description, or definition, of a system in which the present invention is embodied. This comprises a manual entitled "IBM System/360 Principles of Operation," a copy of which is available in the Scientific Library of the U.S. Patent Office, "IBM Form No. A22–6821."

Another reference, which discloses a small system in accordance with the architecture of said System/360 Manual is found in a copending application of the same assignee entitled Data Processing System, Ser. No. 357,372, filed on Apr. 6, 1964, by G. M. Amdahl, et al.

An input/output channel device which is adapted for use in said environmental system is disclosed in a copending application of the same assignee entitled Automatic Channel Apparatus, Ser. No. 357,369, filed Apr. 6, 1964, by L. E. King, et al.

A core storage device is shown in a copending application of the same assignee entitled Storage Drive Sense System, Ser. No. 445,306, filed Apr. 5, 1965, by Anatol Furman.

A bipolar latch, used throughout said environmental system, is described in detail in an article by O. J. Bedrij, entitled Gated Trigger With Biplor Set, IBM Technical Disclosure Bulletin, vol. 2, No. 6, April 1960, page 50 (a copy of which is available in the Scientific Library of the U.S. Patent Office).

A binary trigger is referred to in particular in section 5. This trigger is described in detail in section 11b of a copending application of the same assignee entitled Parallel Memory, Multiple Processing, Variable Word Length Computer, Ser. No. 332,648, filed Dec. 23, 1963, by R. S. Carter and W. W. Welz, now Patent No. 3,270,325, issued on Aug. 30, 1966.

Binary-decimal addition is described in a copending application of the same assignee, Serial No. 223,431, entitled Byte Processing Unit, filed Sept. 13, 1962 by Robert Keslin. A shifter is described in a copending application of the same assignee, Serial No. 162,477, Proportional Space Matrix Printer, filed Dec. 27, 1961 by Richard L. Taylor, now Patent No. 3,174,427, issued on Mar. 23, 1965.

Additional references include the following copending applications of the same assignee as in this case, each of which forms a part of, and is illustrated in, the environmental system, which is entitled Large Scale Data Processing System:

Large Scale Data Processing System, Ser. No. 445,326, filed Apr. 5, 1965, by O. L. MacSorley, et al., now abandoned.

Large Scale Data Processing System, Ser. No. 609,238, filed on Jan. 13, 1967, by O. L. MacSorley, et al., said application being a continuation-in-part of Ser. No. 445,326.

Storage Reference Priority in a Data Processing System, Ser. No. 445,316, filed Apr. 5, 1965, by L. J. Hasbrouck, et al., now abondoned.

Storage Reference Priority in a Data Processing System, Patent No. 3,376,556, filed on Jan. 13, 1967, by L. J. Hasbrouck et al., said application being a continuation-in-part of Serial No. 445,316.

Unit Unavailability Detector for a Data Processing System, Ser. No. 445,318, filed Apr. 5, 1965, by W. P. Wissick, et al. now Patent No. 3,341,824, issued on Sept. 12, 1967.

Rate Control in an Asynchronous Device Storage Accessing Apparatus, Ser. No. 445,319, filed Apr. 5, 1965, by W. P. Wissick, et al., now abandoned.

Rate Control in an Asynchronous Device Storage Accessing Apparatus, Patent No. 3,377,579, filed on Jan. 13, 1967, by W. P. Wissick, et al., said patent being a continuation-in-part of now abandoned application Serial No. 445,319, filed Apr. 5, 1965.

Storage Cancellation and Panel Data Key Fetching in a Data Processing System, Ser. No. 445,311, filed Apr. 5, 1965, by W. P. Wissick, et al., now abandoned.

Storage Cancellation and Panel Data Key Fetching in a Data Processing System, Patent No. 3,374,472, filed on Jan. 13, 1967, by W. P. Wissick, et al., said patent being a continuation-in-part of now abandoned application Serial No. 445,311, filed Apr. 5, 1965.

3.0 NOMENCLATURE

The nomenclature of the present embodiment is almost entirely consistent with that shown in said System/360 Manual. A few exceptions do exist however. One of these is the instruction Execute and is herein referred to in abbreviated form as XEQ, whereas said Manual refers to this instruction in abbreviated form as EX. Another example is the instruction Edit; it is referred to in abbreviated form herein as EDT where as said Manual refers to same as ED. In order to avoid confusion with "execution," "E decode," and other similar functions in the present embodiment, these changes have been made. However, a good definition of each of the instructions which may be performed by the present embodiment is found in said Manual. Additionally, the functions of a data processing system in accordance with the architectural definition within said Manual are applicable to this embodiment, with the exception of the fact that the present embodiment does not provide for: sharing of storage by more than one system, a multiplex channel, direct coupling between computers, large capacity storage, and certain other features which could be available on an embodiment of the system described in said Manual. However, said environmental system is readily adapted for the achievement of these functions.

In the present embodiment, a bit means a binary unit of intelligence, which can be either a one or a zero. A byte comprises eight bits, two bytes comprise a syllable or a half-word. Two syllables, or two half-words comprise a word, which includes thirty-two bits. A storage word is two words or sixty-four bits in the environmental system of the present embodiment. In storage, and within the data flow of the environmental system, there is one parity bit for each eight bits of data; at certain points in a data flow this is altered; for instance, at the output of an adder, it is possible that parity may be carried to several stages of logic on a four bit basis, and then combined on an eight bit basis.

In the detailed descriptions herein, the signals which propagate between various figures are all identified by unique lines which are referred to in the upper case (such as SAR meaning the output of the storage address register, CPU RST being the line that causes a computer reset of a particular type). As is discussed more fully in section 5, hereinafter, the use of positive and negative signals as inputs to positive and negative-type circuits is so customary, that it no longer has any significance to consider signals in actual circuitry as being either the true or the complement of an event; for instance, if a signal is generated in a positive sense when the event occurs, a minus signal may nonetheless be required to indicate that event due to the fact that the circuit which is utilizing the signal requires a negative input. For that reason, complementary functions (such as NOT LC, meaning the complement of the LC signal) are referred to as inputs even though they may not be explicitly generated in the circuit where the event is manifested by the true signal.

In block diagrams which comprise a plurality of blocks, each block being represented by one or more figures, the figure or figures within which the details of the particular block are shown may be identified in that block by figure number only, without the word "FIG." actually being printed within that block. This allows a simpler block configuration which is easier to read.

In the description of the detail figures, the various circuit elements are referred to by reference numerals, the reference numerals being applicable only in the particular figure number. However, in any case where a particular item is referred to in more than one place, it would have the same reference numeral wherever it is referred to. On the other hand, reference numerals between 1 and 30 are used repetitively throughout the environmental system due to the fact that the size of the environmental system would require reference numerals having four or five digits if completely sequential reference numerals were used for the entire environmental system. Therefore, any possible tendency toward confusion is alleviated by also specifying the figure number along with the reference numeral; additionally, the description itself is patently clear insofar as the precise element to which reference is being made.

When terms such as "storage cycle" or "last E cycle" are used, machine cycles as such are not necessarily involved. For instance, a storage cycle requires five machine cycles in the embodiment of said environmental system; last cycle triggers may be set from the start of NOT L time to the start of the following NOT L time, a period equal to a 200 nanosecond machine cycle, but displaced therefrom by approximately 65 nanoseconds since the basic machine cycle is defined to be from the start of A time to the end of A time, as is described in section 7. The duration or phase of any specially-referred to cycle often differs from a basic machine cycle. The terms, when used, refer to the latched condition or event being described, as is apparent in the context where used.

In order to facilitate cross referencing between the various copending applications, and most particularly, to facilitate cross referencing of embodiments in said copending applications of portions of said environmental system with the embodiment of a full environmental system, constant sequential figure numbers are used in all of said copending applications, whereby all figure numbers are identical in all of the cases. In order to reduce the cost of printing, figure numbers which relate to circuits not required in smaller embodiments are shown in an illustrative manner only. Any reference to a figure which is shown in an exemplary form in one of said copending applications should be interpreted as a reference to that same figure in the embodiment of said environmental system.

In certain instances, control lines comprising a particular combination of operational decoding or other status indications may not be shown in detail; that is, a line called "BR OR STATUS SWX" may be utilized, as an input to a circuit, but may not be generated, as an output from a circuit. However, there are innumerable examples of generated decode lines such that the generation of any other one would be well within the skill of the art. As an example, a line called "VFL T1 OR Y≠0" could be generated by the OR of "VFL T1" with "Y≠0," or with "NOT Y EQ 0," or by ORing the bits of the Y REG to see that Y does indeed equal other than zero.

4.0 BRIEF DESCRIPTION OF ENVIRONMENTAL SYSTEM FIG. 2

In FIG. 2, a block representation of said environmental system is shown to include a bus control unit (BCU) which is described in section 6, and which provides data flow communication between the various units of the system, and provides controls for the storage devices. The operator controls, certain maintenance controls, and basic stop start and reset controls are provided in the power distribution unit (PDU) described in section 21. The system also includes an I unit, the data flow portion of which is described in section 9, the main other functions of the unit being described in separate sections. The clock is shown in section 7, and includes the main timing pulses which are utilized throughout the system so as to synchronize operations. In section 10, instruction sequencing is described, and instruction fetching is described in section 11. Branching operations, and their effect on the remainder of the system are all described in section 12. Communication with channels, and performance of certain supervisory type instructions, inter alia, are described with respect to an I execution unit (IE UNIT) in section 13. Interruption handling, and functions which, although not interruptions, are handled by the interruption circuitry, are described in section 14 of said environmental system. The E unit of said environmental system includes a binary portion and a VFL portion, which are referred to in a compound fashion; both the binary and VFL portion are considered part of the E unit, and E unit controls can come from either portion. However, the binary portion is generally not referred to as such, but is referred to merely as the E unit, and the VFL (variable field length) portion is usually referred to as the "VFL." Storage devices are not completely described herein, but the logical control thereover as it relates to the bus control unit is described in section 22.

5.0 COMPONENT CIRCUITS FIG. 3 THROUGH FIG. 8

In FIG. 3 through FIG. 8, component circuits of the type which may be utilized in said environmental system are illustrated. These are not exhaustive, and merely illustrate types of circuits which might be utilized, and the manner in which they are illustrated in the detailed description of said environmental system.

In FIG. 3a, a simple latch is shown. This comprises an "AND-OR-INVERTER" combination which includes an OR-INVERT circuit 1 and two AND circuits 2, 3 as well as two inverters 4, 5. In normal operation, whenever the LC line is positive, the inverter 5 will provide a signal "b" to the AND circuit 2 so that a +X signal, whenever it may arriver, will cause the AND circuit 2 to activate the OR-INVERT circuit 1 thereby generating a —Y signal. If the +X signal is removed, then the —Y signal will disappear. The —Y signal causes the inverter 4 to generate the +Y signal which is fed back to an AND circuit 3; however, so long as the —LC pulse is present, the AND circuit 3 will not operate, so that the circuit of FIG. 3a is essentially an AND circuit whereby a +X signal and the signal from the inverter 5 pass through the AND circuit 2, becomes inverted in the OR circuit 1, and no latching takes place.

When the LC signal turns positive (at NOT L time) then any +X signal will cause a +Y signal to be gated through the AND circuit 3 thereby causing the circuit of FIG. 3a to become latched for the duration of the +LC signal. When the LC signal returns to a negative condition (at L time) then the state of the latch can again be changed. During the time that the circuit is latched, the AND circuit 3 will be passing a signal through the OR circuit 1 provided the latch was on at the time that the latching condition commenced, and the AND circuit 2 is blocked by the inverter 5. When the LC line returns to a negative condition, the AND circuit 3 will be immediately blocked, and the inverter 5, having about a seven nanosecond delay, will later cause the unblocking of the AND circuit 2. Thus, there is a short period of about seven nanoseconds (as illustrated in FIG. 3d) when the circuit of FIG. 3a will have no output whatever. This is of too short a duration to be illustrated in FIG. 3c which shows the operation of the latch of FIG. 3a in general terms.

The circuit of FIG. 3a is illustrated herein as shown in FIG. 3b. Thus, the circuit of FIG. 3a can be considered to be a latch circuit 6 settable by an AND circuit 7 at NOT L time, to be reset at L time.

In FIG. 4a is shown a variation of a latch having a combined reset condition which, as shown in FIG. 4b includes X or NOT Y. Notice that the AND circuit 1 in FIG. 4a has a minus D signal applied thereto which represents a NOT D as illustrated by the AND circuit 2 in FIG. 4b. Also notice that the AND circuit 3 in FIG. 4a has both −X and applied Y signals thereto so that the latched effect will be ended by the disappearance of −X or by the disappearance of +Y. This is illustrated as resetting in response to either X or NOT Y by the OR circuit 4 in FIG. 4b. A still further complicated latch is illustrated in FIG. 5a. This includes an AND-INVERT circuit 1 which passes a signal through an inverter 2 (the output of which then would be positive when the conditions to the AND invert circuit 1 are met) so as to cause an AND circuit 3 to operate when the +AC signal appears. +AC means a positive controlled clock signal having the A time duration. The "C" within "AC" stands for "controlled," in contrast with "running," as is the case when an AR signal is involved. The AR signal would be of the same duration and timing as the AC signal, but could run even through single cycle operations, whereas the AC signal would be stopped during single cycle operations.

The latch of FIG. 5a can be reset by the CPU RST signal, or by the raw output of the AND INVERT circuit 1 as applied to an AND circuit 4. The circuit of FIG. 5a would be illustrated herein as shown in FIG. 5b, wherein an AND circuit 5 will either set or reset the latch in dependence upon whether the conditions are met, due to the assistance of an inverter 6. Notice also that single-input AND circuits such as the AND circuit 7 in FIG. 5a actually represent merely an input to the OR INVERT circuit, as illustrated by the direct application of the scan signal to the OR circuit 8 in FIG. 5b.

Figure 6A:
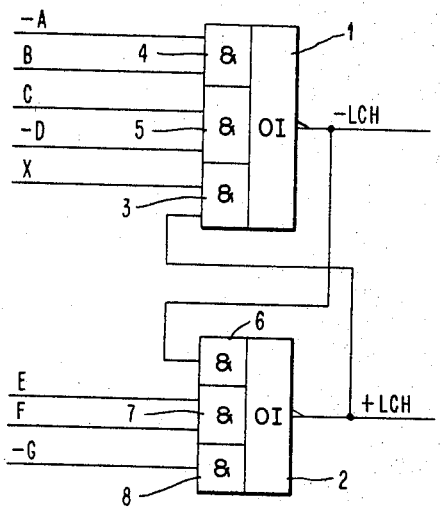
Figure 6B:
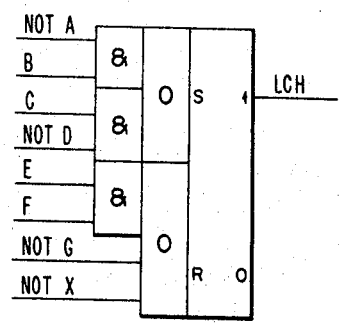

A variation in the circuit of FIG. 5a is shown in FIG. 6a, wherein a first OR INVERT circuit 1 operates when the latch is in the on condition, and a second OR INVERT circuit 2 operates when the latch is in the reset condition. When the OR circuit 2 operates, it has a negative output, thereby locking an AND circuit 3. However, a negative output from the OR circuit 2 does not preclude an output from the latch inasmach as either one of two AND circuits 4, 5 could supply an input to the OR circuit 1. If either of the AND circuits 4, 5 do operate, then there will be a minus signal out of the OR circuit 1 which will block a single-input AND circuit 6 at the input to the OR circuit 2 so that the OR circuit 2 will normally have no output unless inputs are applied to either an AND circuit 7 or a single input AND circuit 8. With the OR circuit 2 locked, its positve output will be applied to an AND circuit 3, and if there is an X signal at the AND circuit 3, then the latch will remain on even though either of the OR circuits 4, 5 which turn the latch on in the first place no longer has inputs thereto. This is illustrated more clearly in the circuit shown in FIG. 6b, which represents the manner of illustrating this circuit herein. As seen in FIG. 6b, the latch can be turned on by NOT A and B, or by C and NOT D. If turned on, it will latch up provided that E and F are not both present, and provided that G and X are both present. If the latch turns on and becomes latched in an on condition, then the appearance of E and F together or the appearance of NOT G or NOT X will cause the latch to turn off.

Figure 7A:
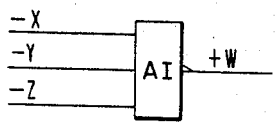
Figure 7B:
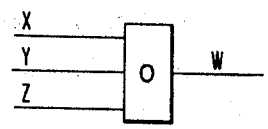

In FIG. 7a, an AND INVERT circuit with minus inputs is shown to create a +W signal. This is fully equivalent to the circuit of FIG. 7b wherein a positive, non-inverting OR circuit responds to positive XYZ signals to generate a positive W signal.

Figure 8A:
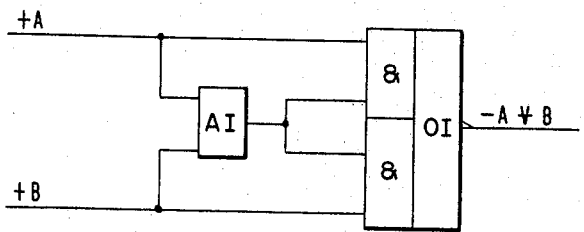
Figure 8B:
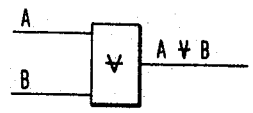

FIG. 8a is a simple illustration of a two input EXCLUSIVE OR circuit, which is represented herein as shown in FIG. 8b. It should be understood that the EXCLUSIVE OR function with only two inputs is a test for oddness: that is, one and only one input must be present; if no inputs or two inputs are present, then there will be no output. Thus, an odd number of inputs are required. In the embodiment described herein, a term "EXCLUSIVE OR circuit" is utilized to mean a complex of EXCLUSIVE OR circuits which test for oddness and evenness of the inputs thereto. These may be actually manifected in two input EXCLUSIVE OR circuits as shown in FIG. 8a, or may be represented with EXCLUSIVE OR circuits actually responding to more inputs. To the extent that more than two inputs are shown, it can be assumed that a three input EXCLUSIVE OR circuit or a two input EXCLUSIVE OR circuit or combinations thereof are utilized in a well-known "tree" fashion so as to provide an EXCLUSIVE OR complex which gives an output whenever the inputs thereto are odd in number.

From the foregoing description, it can be seen that the presence of a plus or a minus signal has no significance in and of itself, due to the way in which a plus or a minus signal may be utilized. For instance, when applied to a +AND circuit of a reset side of a latch as shown in FIG. 6a, it may be a NOT signal, as illustrated by the NOT G signal shown in FIG. 6b. Similarly, when applied to a resetting AND circuit such as the AND circuit 3 in FIG. 4a, a −X signal really becomes an X signal in terms of its logical connotation as illustrated in FIG. 4b. Also, the minus signals applied to the circuit of FIG. 7a in fact are plus signals when the function of that circuit is considered to be an OR circuit. For that reason, the simplified showing of the present embodiment (such as ilustrated in FIGS. 3b, 4b, 5b, 6b, 7b and 8b) do not consider whether a plus or minus signal may be generated at the source of a signal, or whether that signal may be generated in true or complement form, since such considerations have no bearing on that way in which the signal may be utilized. However, at the input to any particular circuit (such as the input to FIG. 6b) the affirmative or negative function which the signal represents does have logical connotation and is shown. To the extent that a "NOT SIGNAL" is required but not generated, it is implied that one with ordinary skill in the art could obtain the opposite phase thereof from the source of the "SIGNAL." This is illustrated, for instance, in FIGS. 3a and 3b where both phases are generated in 3a, and only the affirmative phase is generated in 3b, the complement thereto being implied.

6.0 BASIC BUS CONTROL UNIT

The BCU (bus control unit) acts as a buffering traffic control for data, address, control, and checking signals between the storage devices and the rest of the system. In this embodiment, the CPU (including the I unit, the IE unit, the BE unit, and the E unit) is considered to be a single device with respect to the accessing of storage, and it must share storage with the channels. Each of the I/O channels 1–6 has a priority rating corresponding to its number (1–6), and the MC (maintenance channel) including panel keys and panel indicators) comprises a seventh, lowest-priority channel for storage reference purpose. In accessing storage, priority is determined as between channels, and then priority is determined between the selected channel and the CPU. Stated alternatively, the CPU may reference storage unless it is prevented from doing so by a prior outstanding request for an available storage device initiated from one of the channels; which one of the channels will be permitted to reference storage is determined independently by a channel priority circuit. For purposes of completeness and simplicity, the embodiment of a bus control unit described in this section does not include provisions for handling a large capacity storage, nor for the sharing of a single storage device by more than one data processing system. The BCU comprises three general portions, shown in FIG. 9, FIG. 10 and FIG. 11, and described in sections 6.1, 6.2 and 6.3, respectively of previously referred to application Ser. No. 609,238.

7.4 CLOCK CIRCUIT

References herein to FIGS. 56–59, 61 and 62, refer to figures in said application Ser. No. 609,238. The actual timing signals used throughout the system are generated by the clock circuits shown in FIG. 59, the upper portion of which comprises the control clock, and the lower portion of which is identical to the upper portion and comprises the running clock; the only difference between them being that the control clock is operated by the gated control pulse signal from FIG. 58, whereas the running clock is operated by the gated running pulse signal from FIG. 58. The operation of the clock generating circuits is illustrated in FIG. 60 through FIG. 62. In FIG. 60 through FIG. 62, an OSC PULSE (illustration 1) comprises the signal on the OSC line. It is to be noted that this signal is about 45 nanoseconds in width, and the beginning of each pulse is separated from the beginning of the following pulse by 200 nanoseconds, which comprises a machine cycle. The delayed oscillator pulse (OSC PULSE DLY, illustration 2) comprises the output of the delay unit 7 in FIG. 58. This is the signal which gates the signals on the GATED CTRL PULSE line and on the GATED RUNNING PULSE line. These signals are utilized to generate the actual timing signals as shown in FIG. 59.

Whenever the clock has to be stopped because of error signals which give rise to a check condition, it is desirable to always know that the clock will stop at a definite time in relation to the time at which the error condition was sensed. Therefore, the clock circuits of FIG. 56 through FIG. 59 are arranged so that the clock will always stop within a machine cycle following the cycle within which an error could be sensed. Referring to illustration 3 of the check signal (CHK) in FIG. 60, it will be seen that check signals can appear at a number of different times within a machine cycle. It is therefore desirable to establish that these check signals will fall within a single defined machine cycle. For this reason, the final timing of the various clock signals (as shown in illustrations 7–12 in FIG. 60), is set up so that A time begins prior to the time when any of these check signals could occur and the next A described in section 7.5) only during the nonoscillator pulse time. Thus, either of the first two check setting times (3a, 3b) will cause the check latch to be set at time 4a, all other occurrences of a check condition causing the check latch to be set at a corresponding time, approximately 20 nanoseconds after the check condition has occurred, due to the time delays inherent in logic circuits used for setting the check latch. Thus, the establishment of a signal from the check latch is related to the timing of the oscillator in such a fashion that the basic timing signal which defines a machine cycle, which is A time, must occur approximately 180 nanoseconds after the oscillator pulse output on the OSC line in FIG. 56.

8.0 SCAN

Within the embodiment of said environmental system, the word "scan" means the forcing of conditions in bistable devices throughout the system, so as to cause the system to establish a particular state. This is accomplished by a network of circuitry which is complex in its size, but is conceptually very simple. The process includes defining a scan mode, identifying a particular cycle within the scan mode, and utilizing certain bits of a storage word fetched from storage as data bits to force particular bistable devices.

8.1 SCANNING INTO THE I UNIT FIG. 68

I unit scanning is illustrated in FIG. 68. Scanning into the I unit is controlled by six scan word cycles, each one of which causes a 63-bit word to be set into various latches and triggers of the machine. The first scan cycle is defined as word 1 (WD 1), which causes all 63 bits of the J register to be loaded into the PSW register, bit for bit, as shown in FIG. 68. In word 2 of the scan, bits 0–31 are loaded into the IOP register, and IOP parity bits themselves are forced by bits 32–36 of the J register. During this same cycle, the storage address register is loaded with bits 40–63 of the J register, and the parity bits of the storage address register are forced by bits 37–39 of the J register. In a similar fashion, the other words are applied to the various circuits as shown in the chart of FIG. 68. The manner of providing this gating is twofold: as in the case of the PSW register, scan gates are provided as shown at the top of FIG. 70 of application Ser. No. 609,238. When status triggers and registers are being scanned into (as in the case of word 5 and word 6, FIG. 68) actual signals are generated by scan gate signals in combination with bits of the J register as shown in FIG. 71 of application Ser. No. 609,238. But the circuits of FIGS. 70 and 71 are merely illustrative of the manner in which scanning signals may be applied to the circuits of this embodiment.

8.2 SCANNING INTO THE E UNIT FIG. 69

A chart which is illustrated somewhat differently than FIG. 68, but which contains the same information, is shown in FIG. 69. E unit scanning commences after I unit scanning, and includes word 7 through word 15 of a scan operation. The chart of FIG. 69 is not complete as shown therein, bits 36–62 thereof for words 7 through 14 being illustrated in the following chart:

E Scan-in Chart—Word 7

Bit Trigger
- 36 J 0–7 EA
- 37 J 0–36 MA T/C
- 38 J 0–31 MA T/C
- 39 J 32–39 EA
- 40 J L 32 MA T/C
- 41 J For Parity MA T/C
- 42 K 0–63 MA
- 43 K R4 MA
- 44 K L2 MA
- 45 DC 8
- 46 DC 4
- 47 DC 2
- 48 DC 1
- 49 DB 0
- 50 DB 1
- 51 DB 2
- 52 DB 3
- 53 DB P
- 54 QUOT OVFLO
- 55 QUOT SIGN OVFLO
- 56 QUOT INSRT Z VALID
- 57 QUOT INSRT Z QUOT
- 58 QUOT INSRT DIV TRUE

9.0 INSTRUCTION UNIT DATA FLOW

As is well known in the data processing art, every computer, or data processing system, utilizes instructions which include an operation portion that defines the actual data handling steps which the computer is to perform as well as an address portion which defines a location in storage of the data, or operands, upon which the operation is to be performed. Traditionally, a computer will have a section of the machine set aside for the purpose of handling the instruction, which section may have a variety of names such as control unit, instruction sequencing unit, or instruction unit. This portion of the machine is referred to herein as the I unit, the I unit selects instructions, handles branch and interrupt functions, communicates with the channels, and performs other related control functions.

The description of the I unit herein is divided into "data flow" and controls. "Data flow" refers to the main registers, adders, incrementers, and decoders among which the manifestations of instructions, or portions of instructions, are routed, so as to perform the registering, testing, incrementing, and decoding of their instruction manifestations so as to derive a useful result therefrom.

The description of the I unit data flow is covered in two different ways herein: first, a complete look at the data flow will be given in sections 9.1 et seq, followed by individual descriptions of main portions thereof. The block diagrams of the first section show the same matter as the block diagrams of the second section, but the purpose and approach of the drawings differs. In studying the circuitry in detail, the second section should be utilized; to get an idea of how instructions are handled in this system, the drawings of the first section should be utilized.

9.1 GENERAL INTRODUCTION TO I UNIT DATA FLOW

The I unit data flow is described in conjunction with portions of the E unit (which performs the arithmetic and logic operations upon operands, thereby executing the instructions), and the BCU (bus control unit, which controls the flow of data to and from storage units). The I unit data flow may be considered to comprise four portions:

Instruction selection shown in FIG. 72 and described in section 9.1.1;

Instruction input paths shown in FIG. 73 and described in section 9.1.2;

Instruction decoding shown in FIG. 74 and described in section 9.1.3; and

Instruction utilization shown in FIG. 75 and described in section 9.1.4.

9.1.1 INSTRUCTION SELECTION FIG. 72

In the upper central section of FIG. 72 is shown the program status word register (PSW). This register is shown in detail in FIG. 131 through FIG. 139 of application Ser. No. 609,238. The PSW contains the system mask, storage protection keys, status bits indicating that the machine is utilizing ASCII code (A), the machine check mask (M), a WAIT bit (W), a PROBLEM bit (P), the INTERRUPTION CODE (IRPT CODE), the instruction LENGTH CODE (LC), the CONDITION CODE (CC), the PROGRAM MASK (PGM), and the instruction counter register (ICR), including a low order portion thereof (LO). It is the ICR which determines the address of the next instruction in a sequence of instructions which comprise a program.

The ICR feeds an incrementer (INCR) which increments the instruction address each time that an instruction buffer register is to be loaded from storage; the ICR also feeds a gate select adder (GSA) which updates the instruction count each time an instruction is performed so as to generate a correct address for the next instruction in a sequence. The INCR is shown in detail in FIG. 140 through FIG. 154 of application Ser. No. 609,238. The output of the INCR may be returned to the ICR and may also be applied to the SAR (storage address register) and the H REG (H register, a backup for the storage address register), as well as to a PGM STR COMP (program store compare circuit) and to the high order half (K 0–31) of the K register. The INCR is sometimes used merely as a data path to pass 32 bits from one portion of the PSW register to the K register, and is sometimes used to check (for correct parity) the two halves of the PSW. In order to provide a 32 bit data path, the INCR is provided with an INCR EXT (incrementer extender) which provides the low order 8 bits (0–7) of the data path when the INCR is so utilized. The INCR may also receive inputs from the H REG.

The illustrative diagram of FIG. 72 also shows a gate select adder and gate select register (GSA, GSR) which control the selection of a particular group of instruction bytes from among 8-byte storage words as described in section 9.1.2. Since each instruction has at least two bytes, any addressing of storage is on a byte basis, the lowest ordered bit (23) of the ICR is not utilized in selecting instructions from the AB REG; thus, only bits 20–22 are involved in the gate select mechanism. The GS mechanism is shown in FIG. 156 through FIG. 162 of application Ser. No. 609,238.

9.1.2 INSTRUCTION INPUT PATHS FIG. 73

The output of the gate select register (GSR) in FIG. 72 is applied to a gate select decode circuit GS DEC (AB REG) so as to select the correct 32 bits at one time out of the AB register (A REG, B REG). The AB register is utilized as a buffer register for instructions which are fetched from storage so as to insure that there is always one instruction available for processing in addition to the instruction which is currently being processed in the I unit. Since the I unit generally processes each instruction concurrently with the execution of a previous instruction by the E unit, this means that the contents of the AB register may be as much as two instructions ahead of that which is being executed. Instructions are received from one of the storage units (STG 1A, STG 1B) over the storage bus out (SBO), or on the channel storage bus out (CH SBO) including data from the power distribution unit (PDU, which includes the maintenance channel). All data so received are stored in the storage bus out latch (SBOL), instruction being transferable directly to the AB register, and all data, including instructions, being transferable to the channel storage bus out or to the J register (J REG). Instructions may be temporarily placed in the J REG if they have not been fetched by a certain time in an instruction fetch cycle, and will thereafter be transferred to the AB register provided that a branch has not occurred. In all other cases, timely received instructions are transferred directly from SBOL to the AB register. The contents of the AB register is transferred to the IOP register and to the PRE DEC or TP (predecode) circuit by means of the gate select mechanism, 32 bits at a time. The choice of the 32 bit group to be selected from the AB register is made by the GATE SEL DEC (gate select decode) circuit which is controlled by the gate select circuitry of FIG. 72 so that the extraction of each instruction will result in extracting the next sequential instruction on a following operation. The AB register, and GS output gating therefor, are shown in FIG. 76 through FIG. 80 of application Ser. No. 609,238.

9.1.3 INSTRUCTION DECODING FIG. 74

The 32 bits from the AB register are applied to the IOP register as shown in FIG. 74. This register includes an operation portion (OP), an R1 field, an R2–X field, a B field, and a D field. At the time an instruction (or a portion of an instruction) is loaded into the IOP register, preliminary information about the instruction is also being derived from the PRE DEC. The contents of the IOP register are transferred to various circuits which perform different functions in the handling of an instruction. The OP portion is applied to the IOP DEC (ID), where the operation portion is decoded for I unit use. The same portion is transferred along with the R1 portion to the BOP register; in turn, the OP portion of the BOP register is applied to the BOP DEC (BD), for backup operation decoding. It is the IOP and BOP decoders which perform a major portion of the operand and branch decoding in the system. Each of the fields R1, R2–X, and B are used to specify general purpose registers, the contents of which are involved in the execution of the instruction. The R1 field, however, is utilized from the BOP register rather than from the IOP register controlling selection of the general registers. Each of these fields is also tested for zero in order to determine special situations where no general register is to be utilized in accordance with the architectural definition of a data processing system in said System/360 Manual. The B field of the IOP register is applied to the addressing adder (AA) as a component of a storage address for all instructions which reference storage, the addressing adder being shown in FIG. 79 of application Ser. No. 609,238 which the R1 portion of the BOP register also applies to an ER1 register which provides R1 information later in a cycle. The ER1 register is so called because it provides R1 information to the E cycle rather than to the I cycle.

In FIG. 74 various comparison circuits are shown which compare ER1 with R2–X, BR1 with R2–X, and BR1 with B. The purposes of the various comparisons are described in conjunction with the circuits which utilize them. The instruction decoding circuits are shown in detail in FIG. 76 et seq. of application Ser. No. 609,238.

9.1.4 INSTRUCTION UTILIZATION FIG. 75

In FIG. 75, a plurality of general purpose registers (GR) receive information from the K REG under control of the ER1 SEL GR IN lines. The output of a general register selected by one of the lines: IR2 SEL GR, IB SEL GR, BR1 SEL GR, BR1+1 SEL GR lines will be applied to the general bus left or general bus right (GBL, GBR) for application to the register bus latch (RBL) shown in FIG. 73, and to the address adder (AA). The general registers, the GBL and GBR, and the controls therefor are shown in FIG. 114 et seq. of application Ser. No. 609,238. Other inputs to the address adder include a VFL LGTH FLD (VFL length field), the interrupt controls (IRPT CTRLS), and the IOP D field. The output of the address adder is applied to the SAR, and thence to the SAB (storage address bus) which applies address bits to storage. The address adder is also applied to the H register which serves as a sort of backup register for the SAR; addresses which are to be manipulated or compared are derived through the H register whereas utilization of address manifestations is through the SAR.

Also illustrated in FIG. 75 are the channel and unit selection circuits which respond to the H REG. Specifically, either the H REG or channel address signals from the console may be utilized to form a unit address on the UABO as well as channel selecting signals.

It should be borne in mind that FIG. 72 through FIG. 75 are intended as illustrative figures for reference, rather than being descriptive of the hardware as such. All of the hardware illustrated in FIG. 72 through FIG. 75 is illustrated, both in block diagram form, and in detail, in figures relating thereto, described hereinafter.

9.3 ADDRESS ADDER

9.3.1 Brief description FIG. 164

The address adder and H register are shown in block diagram form in FIG. 164. The addressing adder may be considered to be essentially in four sections.

In the first section comprising the circuits of FIG. 165 through FIG. 168 and FIG. 176, a plurality of inputs are combined so as to provide two inputs to the adder together with certain parity inputs. In the second section, which includes the circuit of FIG. 169 through FIG. 173, a final sum is generated in a method that utilizes the input bits as nearly directly as possible, so as to provide a very fast path for data which is flushed through the adder at times when the adder is merely used as a data path. In the third section, which includes the circuit of FIG. 176 through FIG. 180 parity for the sum is generated. The fourth section includes FIG. 181 through FIG. 183 in which various portions of the adder circuit are checked by independent circuitry. The output of the address adder is applied to the storage address register (SAR) in the BCU where it is used for addressing storage. The address adder output is also applied to the H register (FIG. 183–FIG. 20), which is a sort of backup register for the SAR. The H register, in turn, feeds a program store compare circuit (PGM STR COMP), FIG. 184. Each of the circuits briefly mentioned is described in more detail in the ensuing sections.

9.3.2 INPUT SECTION

9.3.2.1 Adder Input Circuit FIG. 165

In the top of FIG. 165, general bus left signals from the general purpose registers on a respective plurality of GBL lines 8–31 are converted to signals on a plurality of corresponding lines L8–L31 together with the complements NOT L8–NOT L31. Also, the parity bits for groups 8–15, 16–23, and 24–31 are also provided. Notice that bits 0 through 7 of the GBL are not used in the address adder. In the center of FIG. 165 a plurality of signals on GBR lines 8–22 are converted to corresponding signals on a plurality of lines R8–R22 and their complements as well as the related parity bits RP 8–15 and RP 16–23. In addition, a plurality of OR circuits 3 respond to either a plurality of general bus right signals on GBR lines 23–31 and P 24–31, or to a plurality of VFL LGTH (length) lines 23–31 and P 24–31 from the E unit. The outputs of the OR circuits 3 comprise a plurality of lines R23–R31 (together with corresponding parity lines) and are applied to inverters 4 so as to supply complement lines NOT R23–NOT R31.

In the bottom of FIG. 165, D field signals from IOP are applied on a plurality of D FLD lines 20–31 so as to supply a corresponding plurality of signals on lines D20–D31, the signals on the lines D25–D28 being generated by a plurality of OR circuits 5 in response to either the D field signals or to interrupt control signals on a plurality of IRPT CTRL lines 25–28. Complement lines are supplied signals by a plurality of inverters 6. Additionally, parity bits DP 16–23 and DP 24–31 are provided.

9.3.2.2 Carry Save Sum And Carry Circuits FIG. 166 through FIG. 168

In FIG. 166a is illustrated the general data format for addresses applied to the addressing adder. Groups of four bits each are utilized to carry propagation purposes, the highest ordered group comprising bits 8–11, the lowest ordered group comprising bits 28–31. Therefore, bit 31 would supply a carry to bit 30, but not conversely. Similarly, propagation is from higher ordered bit to lower ordered bit throughout the adder.

In FIG. 166b, a plurality of two- and three-input circuits are utilized to combine D, R and L inputs, and to provide carry outputs on a plurality of lines CSC 8–CSC 31, and the complements thereto on lines NOT CSC 8–NOT CSC 31. The three-input blocks 1 are illustrated in FIG. 168, wherein a CSC 20 line is energized by an OR circuit 3 in response to any one of three AND circuits 4 each of which responds to a different pair of inputs L20, R20, D20. Thus, the OR circuit 3 will be operated whenever there are two or three inputs to the block 1. Similarly, a signal is generated on a NOT CSC 20 line by an OR circuit 5 in response to any one of three AND circuits 6 each of which is energized by a different pair of complement inputs NOT L20, NOT R20, NOT D20 so that a not carry save carry signal will be generated on a NOT CSC 20 line whenever there is concurrently absent two of the inputs to the block 1. Thus, the block 1, as shown in FIG. 168, will generate either a carry save carry signal or a not carry save carry signal in dependence upon whether there at least two inputs present or not more than one input present, respectively to the block 1.

The two input circuit 2 of FIG. 166b is illustrated in FIG. 167, wherein a signal is generated on a CSC 8 line provided there are two inputs present to an AND circuit 7 on the L8 and R8 lines; similarly, a signal is generated by an AND circuit 8 on a NOT CSC 8 line in response to the concurrent presence of complement inputs NOT L8, NOT R8. Thus the block 2 as shown in FIG. 167 will generate a carry save carry signal if both inputs are present, and will generate a not carry save carry signal if neither input is present.

At the bottom of FIG. 166, a plurality of EXCLUSIVE OR circuits 9 generate carry save sum signals on a plurality of lines CSS 8–CSS 31 in response to an odd number (one or three) of input bits being present to the corresponding one of the circuits 1, 2. The effect of FIG. 166– FIG. 168 is to convert the three inputs L, R and D to two outputs CSC, CSS, so as to permit implementation of the actual addition circuits in a two-input configuration rather than in a three-input configuration.

9.3.3 SUM GENERATING SECTION

9.3.3.1 Generate and Transmit Functions FIG. 169

The CSC and CSS signals generated in FIG. 166b are applied to FIG. 169 so as to produce transmit functions (T) and generate functions (G) which are utilized in a variety of circuits within the address adder. Bearing in mind that the lowest ordered bit is bit 31 and the highest ordered bit is bit 8, the carries necessarily propagate from high numbered bits (such as 31) to low numbered bits (such as 8). The inputs to the adder comprise the outputs of the CSC and CSS circuits, and in each case, a transmit can be generated provided there is a sum for the corresponding bit or a carry for the next low ordered bit. More specifically, a latch 1 will be set by an AND circuit 2 in response to a not L controlled clock signal on the NOT LC line, provided there is a signal on the CSS 31 line. Similarly an AND circuit 3 will cause an OR circuit 4 to set a latch 5 if there is a signal on a CSS 30 line; similarly an AND circuit 6 will cause the OR circuit 4 to set the latch 5 if there is a signal on a CSC 31 line. Thus the OR circuit 4 can respond either to a carry from the low ordered bit (31) or a sum from the corresponding bit (30) so as to manifest a transmit function on the T30 line by means of the latch 5. In a similar fashion, all the remaining bits 8–31 of the carry save sum and carry save carry circuits are utilized so as to generate transmit bits on lines T8–T31, with the complements on lines NOT T8–NOT T31. Note that there is only one input to the AND circuit 2 because there cannot possibly be a CSC 32.

At the bottom of FIG. 169 are circuits which produce the generate functions. The generate functions indicate that a carry is being generated in a particular bit for propagation into the next highest ordered bit. A carry will be generated whenever there is concurrently a carry save sum for the bit and carry save carry for the next lower ordered bit. Specifically, a latch 7 will be set by an AND circuit 8 at NOT LC time provided there is concurrently present signals on the CSS 30 line and the CSC 31 line. Note that there can be no generate from position 31 (and that therefore no G31 line is shown) due to the fact there is no CSC 32, since the lowest ordered bit in the adder is bit 31. In a similar fashion, a latch 9 is set by an AND circuit 10 at NOT LC time provided there is concurrently present signals on the CSS 8 line and the CSC 9 line. All of the latches in FIG. 169 are reset just prior to being set by the signal on the NOT LC line.

9.3.3.2 Group Transmit and Generate Circuits FIG. 170

The transmit and generate signals which are developed in FIG. 169 are utilized, inter alia, to produce group transmit and generate signals in FIG. 170. In this adder, addition is handled in four bit groups such that a carry out of every fourth bit is considered a carry out of the group rather than a carry out of a bit as such. Thus, the OR circuit 1, FIG. 170, will respond to a G28 to produce a generate function, and all higher ordered bits have transmit functions, then the generate will be transmitted through the group so as to produce a group generate. For instance, the AND circuit 2 will respond to a generate in bit 29 together with a transmit for bit 28 so as to produce the equivalent of a generate for bit 28 which causes the OR circuit 1 to produce a generate for the group (28–31). In a similar fashion the AND circuit 3 will produce a group generate provided there is a generate for bit 30 and transmits for bit 29 and bit 28. The OR circuit 1 responds only to two AND circuits and to the generate 28 function due to the fact that there is no generate 31, inasmuch as bit 31 is the lowest ordered bit in the entire adder. An OR circuit 4 will respond to a generate for bit 24 or to an AND circuit 5 which responds to a generate for bit 25 and a transmit for bit 24, to an AND circuit 6 which responds to a generate for bit 26 together with transmits for bits 25 and 24, or to an AND circuit 7 which responds to a generate for bit 27 together with transmits for bits 26, 25, and 24. In a similar fashion, generate signals are provided for all of the groups except for group 8–11.

At the bottom of FIG. 170, transmit functions for groups are produced merely by ANDing together transmits for the individual bits within the group. No transmit is generated for group 28–31 since there never can be an input carry to be transmitted through the group, inasmuch as this is the lowest ordered group in the adder. No transmit is generated for group 8–11 since there is nothing to which a carry may be transmitted inasmuch as this group is the highest ordered group in the adder. Thus transmits are generated for groups 12–15 through 24–27 by corresponding AND circuits 8, 9 in response to the concurrent presence of all the transmits T12–T15, T24–T27 respectively, for each group.

9.3.3.3 Carry Into Group Circuit FIG. 171

The group generate and transmit functions which are developed in FIG. 170 are utilized in FIG. 171 so as to develop signals indicative of a carry into a four bit group. A carry into a group is equal to a generate from the preceding group, which may be produced in a preceding group itself, or may be a generate produced in a still further lowered ordered group and transmitted through the preceding group. Thus, a generate in group 28–31 is equal to a carry into group 24–27 as illustrated by the top line of FIG. 171. An OR circuit 1 in FIG. 171 will generate a signal on the CIN 20–23 line in response to a generate for group 24–27, or in response to an AND circuit 2 which will be operative when there is a generate for group 28–31 together with a transmit for group 24–27. In a similar fashion, other carries into groups are generated, by corresponding circuits, the most complicated of which is that which generates a signal on the CIN 8–11 line in response to a generate for group 12–15, or in response to any one of four AND circuits 4–7. The AND circuit 7 responds to a generate for group 16–19 together with a transmit for group 12–15; the AND circuit 6 responds to a generate for group 20–23 together with transmits for groups 16–19 and 12–15; the AND circuit 5 responds to a generate for group 24–27 together with transmits for groups 20–23, 16–19, and 12–15; and the AND circuit 4 responds to a generate for group 28–31 together with transmits for groups 24–27, 20–23, 16–19 and 12–15. Thus the carry in for one group can be a generate from the preceding group, or a generate transmitted from an even lower ordered group.

9.3.3.4 Carry Into Bit FIG. 172

As shown with respect to bits 30, 27, ... 8 in FIG. 172, the carry in to the lowest ordered bit of a group is the carry in to that group, and a carry in to any other bit comprises a generate from the next lower bit or a generate transmitted from a still further lower ordered bit. Specifically, a carry in to bit 30 is a generate from bit 31. A carry in to bit 29 is produced by an OR circuit 1 in FIG. 172 in response to an AND circuit 2 whenever there is a generate in 31 and a transmit in 30, or in responsive to a generate for bit 30. Similarly, a carry in to bit 28 will be produced by an OR circuit 3 whenever there is a generate from bit 29, when there is a generate for bit 30 together with a transmit for bit 29 which causes an AND circuit 4 to respond, or in response to an AND circuit 5 which is operative whenever there is a generate for bit 31 together with transmits for bits 30 and 29. The remaining circuitry of FIG. 172 (including that which is eliminated therefrom for simplicity operates in a similar fashion.

9.3.3.5 Final Sum Generating Circuit FIG. 173

Final sums are generated in the address adder herein in a manner which is somewhat different from the usual carry lookahead adder; specifically, rather than using half sums of the inputs (essentially the EXCLUSIVE OR of the two input bits) together with lookahead-generated carries into each bit to generate the final sum for each bit, the present adder utilizes the transmit and generate functions of the input bits together with carries into each bit so as to generate the final sum. Referring briefly to FIG. 174, an OR circuit 1 responds to any one of four AND circuits 2–5 to generate a final sum (FS). Each of the AND circuits responds to a different combination of bits so that the OR circuit 1 will be operative provided there is an odd number of inputs thereto. The AND circuit 2 will operate if there are all three bits T, G, C present, which bits represent the transmit, generate and carry-in functions to the corresponding bit. The AND circuit 3 will operate provided there is only the transmit input, the AND circuit 4 will operate provided there is only a generate input, and the AND circuit 5 will operate provided there is only a carry input. Thus each of the AND circuits 3–5 respond to one and only one input bit whereas the AND circuit 2 responds to all three input bits being present. However, it is possible to simplify the circuit due to the relationship between the transmit and the generate function. Since the transmit function is equal to the presence of either of the two input bits CSC and CSS, and the generate function is equal to the presence of both input bits CSC, CSS, it follows that there can be no generate bit without there being a transmit bit, and it also follows that if there is a generate bit there must be a transmit bit. Therefore, since a generate bit is applied to AND circuit 2, there will always be a transmit bit whenever there is a generate bit applied thereto; therefore, it is unnecessary to apply the transmit directly to the AND circuit 2 of FIG. 174. Similarly, since the AND circuit 4 requires the presence of a generate function concurrently with the absence of a transmit function (which can never occur), it is possible to omit the entire AND circuit 4 from the final sum generator. Also, the AND circuit 5 calls for the absence of a generate function which necessarily will occur whenever the transmit function is absent; therefore, it is unnecessary to apply the not generate function directly to the AND circuit 5. Simplified versions of the circuit of FIG. 174 are utilized to form the final sum in FIG. 173.

In FIG. 173, the final sum for bit 31 is merely the carry save sum for bit 31 since there can be no carries into the lowest ordered bit of the adder. An OR circuit 6 responds to any one of three AND circuits 7–9 to generate a final sum for bit 30 in accordance with the principals discussed hereinbefore with respect to FIG. 174. Specifically, if there is G30 and C IN 30, then the AND circuit 7 recognizes the fact that all three inputs are present for that bit; the AND circuit 8 recognizes the condition where there is no T30, and where, therefore, there can be no G30, but there is a C IN 30. The AND circuit 9 is responsive to the presence of a T30 concurrently with the absence of G30 and C IN 30. A plurality of other OR circuits, one for each bit, each operative in the same fashion as OR circuits 6 and 10, shown in FIG. 173, provide final sums for all of the bits of the adder in a similar manner.

It is to be noted that the use of the transmit and generate functions together with the lookahead carries into each bit has eliminated several stages of logic (which stages are shown in FIG. 175) so that whenever the adder is used as a data path with only a single input being applied thereto, this single input will propagate through the adder that much faster than it would if it had to be passed through the half sum circuits of FIG. 175.

9.3.4 PARITY GENERATING CIRCUITS FIG. 176 THROUGH FIG. 180

Parity for the address adder output is provided for each of the three eight-bit bytes; inasmuch as the adder is set up in terms of four bit groups, parity is generated for each four bit group and the parity bits for each pair of four bit groups (which form a byte) are EXCLUSIVE ORed so as to form a final parity bit for the two-group, eight-bit byte to which the bit relates.

In generating parity for each of the four bit groups, the first consideration is that the parity of any four bit group is equal to the EXCLUSIVE OR of the output bits within the group. As is known in the art, each sum bit is equal to the half sum EXCLUSIVE ORed with a carry into that bit, which in turn is equal to the EXCLUSIVE OR of the original input bits EXCLUSIVE ORed with a carry into that bit. Thus, the parity of a group will be equal to the EXCLUSIVE OR summation of each of the half sums in the group which is EXCLUSIVE ORed with the EXCLUSIVE OR summation of each of the carries into each bit of the group. The summation of the EXCLUSIVE ORs of all the carries into the bits of the groups is in turn equal to an odd or even status, as the case may be, of the total number of carries which are present for all of the bits within the group. This in turn can be produced in response to transmit and generate functions for the bits in the group. Thus, it is not necessary to rely on the carries into the bits to generate the parity for the address adder output and therefore it is possible to generate the parity at a time which is closer to the time at which inputs are applied to the adder circuit, due to the elimination of the time delay which results from the circuit response characteristics of the logic circuits which generate the bit carries. The oddness (or evenness) of the input bit carries does not, however, reflect a change in the parity due to a carry into the group; therefore, this factor must be taken into account by considering the effect of the parity of the group which a carry into the group will have. The effect of a carry into a group is handled by an invert parity function which changes the parity factor that is generated in dependence upon the odd or evenness of carries within the group whenever there is an invert parity (INVRT P) function.

In this embodiment, parity of the final sum is determined by considering the fact that the parity of any data bit group is equal to the EXCLUSIVE OR of the individual bits in the group, the parity of each of said bits being equal to a half sum for that bit EXCLUSIVE OR'd with a carry into that bit. Thus, the parity for group 16–23 for instance, is equal to:

(HS 16 EXCLUSIVE OR C IN 16) EXCLUSIVE OR (HS 17 EXCLUSIVE OR C IN 17) ... EXCLUSIVE OR (HS 23 EXCLUSIVE OR C IN 23)

This function is equal to:

(HS 16 EXCLUSIVE OR HS 17 ... EXCLUSIVE OR HS 23)

EXCLUSIVE OR (C IN 16 EXCLUSIVE OR C IN 17 ... EXCLUSIVE OR C IN 23)

In this last equation, the first bracket is equal to the parity of the input to the carry lookahead adder, which in turn is equal to the parity of the input to the carry save adder EXCLUSIVE OR'd with the parity of the carries within the carry save adder; the second bracket is equal to the parity of the bit carries within one of the four bit groups in an eight-bit parity byte, EXCLUSIVE OR'd with the parity of the carries of the other four bit group within the byte. The parity of the bit carries within any four bit group may be expressed in terms of the parity of the bit carries which do not consider a carry into the group EXCLUSIVE OR'd with a factor which reflects the difference if there is a carry into the group. Thus, the parity of the output of the adder for the byte which includes bits 16–23 is equal to the EXCLUSIVE OR of all of the following: the input parity of bits 16–23; the parity of the carry save carries for bits 16–23; an odd carry function for bits 20–30; an INVRT P factor for bits 20–23; an odd carry function for bits 16–19; and an INVRT P factor for bits 16–19. The odd carry function is the indication of whether the bit carries within the four-bit group are odd (or even), disregarding a carry into the group and the INVRT P factor is equal to the effect on this parity of the carry into the group; the effect is to reverse (or invert) the parity under certain circumstances. The generation of parity for the added output is described in more detail in the description of the parity circuits in the following sections.

9.3.4.1 Address Adder Input Parity FIG. 176

The address adder input parity circuit of FIG. 176 utilizes a plurality of EXCLUSIVE OR circuits 1–3 to generate a single parity bit which reflects the parity of the inputs from the general bus left (GBL), general bus right (GBL), and from the D field (D). The EXCLUSIVE OR circuit 1 responds to the parity bits 24–31, for each of these inputs on the L P 24–31, R P 24–31, and D P 24–31 lines. Similarly, the EXCLUSIVE OR circuit 2 responds to three lines relating to parity for bits 16–23. The AND circuit 3 responds only to GBL and GBR bits on the L P 8–15 and R P 8–15 lines since there is no D field input for the byte which includes bits 7–15 (see FIG. 165), and therefore no D field parity consideration is necessary in the circuit of FIG. 176.

Each of the EXCLUSIVE OR circuits 1–3 will cause a corresponding AND circuit 4–6 to set a related latch 7–9 at not L time (due to the signal on the NOT LC line). The outputs of the latches 7–9 comprise parity bits of the input to the adder on corresponding PAR IN lines P 24–31 through P 8–15.

9.3.4.2 Half Sum Generator FIG. 175

True and complement representation of half sums are generated in FIG. 175, wherein the half sum for bit 31 equals the transmit for bit 31, due to the fact that there is no generate in bit 31 (which in turn results from there being no possibility of a carry input to bit 31, it being the lowest ordered bit in the adder). A plurality of AND circuits 1 generate half sums for each bit in response to the presence of a transmit together with the absence of a generate for that bit. A plurality of OR circuits 2 generate complement half sums (not half sum) in response to either the absence of the transmit or the presence of the generate. Thus the OR circuits 2 respond to no bits or two bits whereas the AND circuits 1 responds to one bit only.

9.3.4.3 Odd Carry Generator FIG. 177

The odd carry generator as shown in FIG. 177 generates a signal, for each four-bit group within the adder, to indicate that the conditions within the group are such as will cause an odd number of carries into bits within that group, not considering whether or not there is a carry into the group itself. These signals are generated by a plurality of OR circuits 1, 2, . . . 3, one OR circuit for each four bit group in the adder. Considering first the OR circuit 2, it can be operated by any one of four AND circuits 4–7, each of which corresponds to a different situation. For instance the AND circuit 4 will operate if there is a generate for bit 27, no transmit for bit 26, and no generate for bit 25. This recognizes the fact of a carry into bit 26 only. The AND circuit 7 will operate if there is a generate for bit 27 and a transmit for bits 26 and 25, which will result in bit carries into bits 26, 25 and 24. The AND circuit 5 recognizes the case when there is a carry into bit 25 only, which carry results from a generate in bit 26, the generate from bit 26 not being propagated due to the lack of a transmit for bit 25. The AND circuit 6 recognizes the case where the only generate is that for bit 25 and therefore the only carry is a carry into bit 24. The relationships shown with respect to the AND circuits 4–7 in FIG. 177 may most easily be understood with reference to FIG. 172, bearing in mind that the AND circuit 4 covers the situation where there is a carry into bit 26 only in FIG. 172, the AND circuit 5 of FIG. 177 covers the situation where there is a carry into bit 25 only in FIG. 172, the AND circuit 6 in FIG. 177 covers the situation where there is a carry into bit 24 only in FIG. 172, and the AND circuit 7 in FIG. 177 covers the situation when there is a carry into bits 24, 25 and 26 in FIG. 172. The effect of a carry into the group is considered with respect to the invert parity circuit of FIG. 179, to be described in section 9.3.4.5, hereinafter.

It is to be noted that the OR circuit 1 is responsive only to two AND circuits 8, 9 since there can be no generate for bit 31, the situation of there being a carry into bit 30, or into all three bits 28, 29 and 30 concurrently, cannot occur. Also, only two inputs are required to the AND circuits 8 and 9 since these AND circuits need not recognize the condition of no generate from bit 31 since it is impossible for bit 31 to have a generate function. Thus the AND circuit 8 responds to a carry into bit 29 only, and the AND circuit 9 recognizes the case of the carry into bit 28 only; there is no case for a carry into bit 30 and there is no case for carry into three of the bits at one time.

For each of the groups including bits 8–23, the circuitry is the same as that shown for the group including bits 24–27, associated with OR circuit 2.

9.3.4.4 Carry Save Parity Circuit FIG. 178

In FIG. 178, a plurality of EXCLUSIVE OR circuits 1 generate parity for three eight bit groups on corresponding lines CSC P 8–15 through CSC P 24–31. The EXCLUSIVE OR circuits merely take into account the odd or even characteristics of the total bits present at the output of the CSC generator shown in FIG. 166. Note that the inputs to the EXCLUSIVE OR circuits 1 are NOT CSC lines (geneareted independently in FIG. 166b) rather than CSS lines simply because this provides more independence of circuitry, so that in the event that the CSS bits are generated erroneously, the erroneous generation will not take any part in providing the CSC parity bits which are themselves used for generating the address adder parity. Thus, parity will be supplied for a correct address adder sum even though the address adder sum itself is incorrect, so that the parity circuits themselves will detect erroneous addition in more of the cases which might obtain.

9.3.4.5 Parity Invert Circuit FIG. 179

The parity invert circuit shown in FIG. 179 comprises essentially a plurality of AND circuits 1 . . . 2 each of which corresponds to one of the four-bit groups 8–11 . . . 24–27, there being no parity invert function for the group 28–31 (since there can never be a carry into that lowest-ordered group). Each of the AND circuits 1, 2 is settable by a corresponding pair of OR circuits 3, 4; 5, 6; respectively. The AND circuit 1 will operate whenever there is a carry into group 8–11 concurrently with the absence of a half sum for bit 11. The AND circuit 1 will also operate whenever there is a carry into group 8–11 concurrently with the presence of a half sum for bit 10 in the absence of a half sum for bit 9. This is achieved by the OR circuits 3, 4 which operate in a manner equivalent to that shown in FIG. 179. In FIG. 179, and AND circuit 1a will operate in response to a carry into group 8–11 checks the parity for one two-group, eight-bit byte. Since the half sums are equal to a condititon of oddness as to each bit (that is, that there may be a carry save carry into the adder at that bit, or a carry save sum, but not both), it follows that the half sums should reflect the same parity condition the parity of the input to the carry lookahead adder. As described in section 9.3.4.6, with reference to the address adder parity circuit of FIG. 180, the parity of the input to the carry lookahead adder is equal to the parity of the input to the carry save adder EXCLUSIVE OR'd with the parity of the carry save carries; therefore, each of the EXCLUSIVE OR complexes 5–7 is associated with an EXCLUSIVE OR circuit 8–10, respectively, which combines the parity into the address adder with the carry save parity so as to provide at the output of the EXCLUSIVE OR circuits 5–7 a signal which reflects the parity of the input to the carry lookahead adder. Thus, each of the EXCLUSIVE OR complexes 5–7 should reflect a total parity count which is odd, and in the event that it does, it provides a signal to the related inverter 2–4 which prevents the OR circuit 1 from generating a half sum error signal on the HS ERROR line.

9.3.5.3 Carry Error And Addressing Adder Stop Clock Circuit FIG.183

The carry error circuit shown at the top of FIG. 183 comprises essentially a single OR circuit 1 (which could however of course be implemented by a suitable number of interconnected OR circuits of a smaller size) which responds to the outputs of a plurality of EXCLUSIVE OR circuits 2, 3 . . . 4. Each of the EXCLUSIVE OR circuits compares a carry out of a bit with a carry into the next higher ordered group: for instance, the EXCLUSIVE OR circuit 2 compares a carry out of bit 28 with a carry into group 24–27. Since these should be identical, the presence of only one of them will cause the EXCLUSIVE OR circuit 2 to provide a signal to the OR circuit 1 thereby generating a signal on the CARRY ERROR line.

The carry error and the half sum error are fed to corresponding AND circuits 5, 6 at the bottom of FIG. 183. Either of these AND circuits or a signal on a SCAN IN AA ERROR line may operate an OR circuit 7 so as to set a latch 8. The output of the latch 8 comprises a signal to the clock circuit to stop the clock because of an addressing error, said signal being passed via an AA STOP CLK line. The AND circuits 5, 6 are operated by a signal on a SMPL AA ERROR line, which signal is generated in the general control circuits, for which reference may be made to other portions of said environmental system. Latch 8 is reset by a signal on the ERROR RST line.

9.3.5.4 Address Adder Outgating FIG. 185

In FIG. 185, a signal is generated on a GT AA TO SAR by an OR circuit 1 in response to interrupt, VFL, or IOP decode signals on the IRPT GT AA TO SAR, VFL GT AA TO SAR, or ID GT AA TO SAR lines. The ID AA TO SAR line is gated by an AND circuit 2 at the turn on of T2. The VFL interruption controls are also applied to an OR circuit 2 to generate a signal on a SMPL AA ERR line to cause a sampling of address adder error when the address adder is actually used. The OR circuit 2, as well as an OR circuit 3 are operated also by a VFL GT AA TO H line. The OR circuit 3 can thus generate a signal on a GT AA TO H line; notice that turn on of T2 will always cause the addressing adder to be gated to the H register due to the application to the OR circuit 3 of a signal on the TON T2 line. As can be seen in FIG. 264 this is sometimes redundant, but nonetheless is provided automatically so as to eliminate the redundant, but nonetheless is provided automatically so as to eliminate the circuit 2 is also responsive to an AND circuit 4 which will operate the turn on of T2 provided there is a signal on a ID SMPL AA ERR.

Sections 9.4 through 22 are shown in the case relating to said environmental system, which is identified in section 2 herein.

While the invention has been shown and described with respect to an illustrative embodiment thereof, it should be apparent to those skilled in the art that various changes and omissions in the form and details thereof may be made therein without departing from the spirit and scope of the invention.

What is claimed is:
1. A high speed multiple input adder, comprising:
   a carry save adder;
   a carry propagate adder;
   means responsive to said carry save adder and to functions generated within said carry propagate adder to generate a predicted parity;
   and means responsive to input operands, to said carry save adder, and to components of said carry propagate adder for checking the operation thereof.
2. A high speed multiple input adder, comprising:
   input means for presenting a plurality of operands for combination in said adder;
   a carry save adder responsive to said input means for generating carry save carries and carry save sums;
   a carry propagate adder connected to said carry save adder for generating a final sum in response to said carry save sum and to said carry save carry; and
   means responsive to said carry save adder and to functions generated within said carry propagate adder to generate a predicted parity.
3. A high speed multiple input adder, comprising:
   input means for presenting a plurality of operands for combination in said adder;
   a carry save adder responsive to said input means for generating carry save carries and carry save sums;
   a carry propagate adder connected to said carry save adder for generating a final sum in response to said carry save sum and to said carry save carry; and
   means responsive to input operands, to said carry save adder, and to components of said carry propagate adder for checking the operation thereof.
4. The device described in claim 2, additionally comprising:
   means responsive to input operands, to said carry save adder, and to components of said carry propagate adder for checking the operation thereof.
5. A high speed multiple input adder, comprising:
   means for presenting at least three input operands to said adder;
   a carry save adder;
   a carry propagate adder;
   means responsive to said carry save adder and to functions generated within said carry propagate adder to generate a predicted parity;
   and means responsive to input operands, to said carry save adder, and to components of said carry propagate adder for checking the operation thereof.
6. A high speed multiple input adder, comprising:
   input means for presenting three or more operands for combination in said adder;
   a carry save adder directly responsive to said input means for generating carry save carries and carry save sums;
   a carry propagate adder connected to said carry save adder for generating a final sum in response to said carry save sum and to said carry save carry; and
   means responsive to said carry save adder and to functions generated within said carry propagate adder to generate a predicted parity.
7. A high speed multiple input adder, comprising:
   input means for presenting three or more operands for combination in said adder;
   a carry save adder directly responsive to said input means for generating carry save carries and carry save sums;

concurrently with the operation of an OR circuit 7 which may in turn be operated either by a not half sum for bit 11 or by an AND circuit 8 which requires concurrent presence of a half sum for bit 10 and no half sum for bit 9. The circuit of FIG. 179 requires fewer levels so it operates somewhat faster than the circuits shown in FIG. 179, and is therefore usually found to be preferable. The AND circuit 2 is equivalent in all respects to the AND circuit 1, being operated in response to the outputs of OR circuits 5 and 6 together with a carry into the bits 24–27.

The theory behind the circuit of FIG. 179 is illustrated in the following chart:

|   | Half Sums Without C IN 24-27 | | | | Half Sums Reflecting C IN 24-27 | | | | Parity Change | Unique Identity |
|---|---|---|---|---|---|---|---|---|---|---|
|   | 24 | 25 | 26 | 27 | 24 | 25 | 26 | 27 | | |
| a | 0 | 0 | 0 | 0 | 0 | 0 | 0 | 1 | X | Not HS 27. |
| b | 0 | 0 | 0 | 1 | 0 | 0 | 1 | 0 | | |
| c | 0 | 0 | 1 | 0 | 0 | 0 | 1 | 1 | X | Do. |
| d | 0 | 0 | 1 | 1 | 0 | 1 | 0 | 0 | X | HS 26, not HS 25. |
| e | 0 | 1 | 0 | 0 | 0 | 1 | 0 | 1 | X | Not HS 27. |
| f | 0 | 1 | 0 | 1 | 0 | 1 | 1 | 0 | | |
| g | 0 | 1 | 1 | 0 | 0 | 1 | 1 | 1 | X | Do. |
| h | 0 | 1 | 1 | 1 | 1 | 0 | 0 | 0 | | |
| i | 1 | 0 | 0 | 0 | 1 | 0 | 0 | 1 | X | Do. |
| j | 1 | 0 | 0 | 1 | 1 | 0 | 1 | 0 | | |
| k | 1 | 0 | 1 | 0 | 1 | 0 | 1 | 1 | X | Do. |
| l | 1 | 0 | 1 | 1 | 1 | 1 | 0 | 0 | X | HS 26, not HS 25. |
| m | 1 | 1 | 0 | 0 | 1 | 1 | 0 | 1 | | Not HS 27. |
| n | 1 | 1 | 0 | 1 | 1 | 1 | 1 | 0 | | |
| o | 1 | 1 | 1 | 0 | 1 | 1 | 1 | 1 | | Do. |
| p | 1 | 1 | 1 | 1 | 0 | 0 | 0 | 0 | | |

The chart is illustrative of the operation of the AND circuit 2 which generates a signal on an INVRT P 24–27 line. Considering the left most column, the bits within the groups 24–27 are shown when one ignores a carry into the group. In the second column from the left, the bits are shown after a carry into the group has been reflected. Whether or not a parity change has occurred in the bits (as a result of the carry in being reflected in the half sums), is illustrated in the third column, where an "X" delineates that a parity change has occurred. The right hand column is indicative of the conditions utilized by the AND circuit 2 and the OR circuits 5, 6 to sense the configuration of half sums (as in the left-most column) for which a parity change will occur and that, therefore, any parity predicted on the basis of half sums prior to the reflection of C IN 24–27 must be changed. Notice that bit 24 is immaterial in this logic due to the fact that the parity will either change or not in dependence upon the three lower bits of the group, without regard to the highest ordered bit, as indicated by the symmetry between group a–h (at the top of the chart) and group i–p (at the bottom of the chart). As an example only, line "a" of the chart illustrates that if the half sums for the group 24–27 are all ZEROS when one ignores a carry into the group, a carry in to the group will cause only bit 27 to change to a ONE. This results in a change in parity from even to odd and therefore must be sensed by the AND circuit 2. Since the half sums in the left most column which do not take into account a carry into the group include not HS 27, that fact will be sensed by the OR circuits 5, 6 causing the AND circuit 2 to generate a signal on an INVRT P 24–27 line. All of the other groups generate invert parity signals in a similar fashion.

9.3.4.6 Address Adder Parity FIG. 180

In FIG. 180, each of three EXCLUSIVE OR complexes 1, 2, 3 generates a signal on a corresponding line P 24–31 through P 8–15. Considering first the EXCLUSIVE OR complex 2, a signal will be generated on the P 16–23 line provided there is an odd number of inputs to the complex. The theory of operation of the circuit FIG. 180 is discussed in section 9.3.4. and is based on the well known axiom of the parity of the sum is equal to the parity of the inputs EXCLUSIVE OR'd with the parity of the bit carries within an adder. Considering that the inputs to the carry look ahead adder herein are in fact the carry save carries and carry save sums, the parity of the carry save carries and of the carry save sums is in fact the parity of the input. The parity of the carry save sums is identical to the parity of the input to the carry save adder, which in turn is the parity of the input bits to the entire address adder circuitry. This is true because each carry save sum is merely the EXCLUSIVE OR of the carry save inputs. Therefore, the input parity EXCLUSIVE OR'd with the parity of the carry save carries is equal to the parity of the input bits to the carry look ahead adder. The parity of the carries within the adder is equal to the parity of the bit carries which in turn equals the oddness (or the evenness) of the bit carries within the group, excluding the effect of a carry into the group, EXCLUSIVE OR'd with a signal indicating that the parity for that group should be inverted as determined by the INVRT P lines. Thus, the EXCLUSIVE OR composite 2 in FIG. 180 responds to the parity in and to the carry save carry parity of the two-group byte (16–23); to the odd carry and the invert parity function for group 20–23, and to the odd carry and invert parity function for group 16–19. Thus, all of the factors are taken into account by each of the EXCLUSIVE OR composites 1, 2, 3. Notice that the EXCLUSIVE OR composite 1 is simpler, because there is no invert parity function for bits 23–31 inasmuch as there cannot be a carry into group 28–31.

9.3.5 ADDER CHECKING CIRCUITS FIG. 181 THROUGH FIG. 183

To check the operation of the adder, a half sum error circuit FIG. 181 and a carry error circuit FIG. 183 each determine independently whether or not there is an error in a carry or in the half sums generated for the adder. The carry error circuit FIG. 183 responds to carries out of each group from FIG. 182 and to carries into each group. The half sum error is generated in response to adder input parities together with the output of the half sum circuit 175. The details of the operation of the circuits are described in section 9.3.5.1 et seq.

9.3.5.1 Carry Out Of Group FIG. 182

In FIG. 182, a plurality of OR circuits 1, 2 . . . 3 is provided, one for each of the five lower-ordered four-bit groups in the adder, each generating a signal on a corresponding line: C OUT 28, C OUT 24, . . . C OUT 12, there being no carry out of the group which includes bit 8 since it is the highest ordered bit in the adder, and a carry out of the address adder is ignored. The OR circuit 2 (as an example), responds to either one of three AND circuits 4–7 each of which reflects a carry into a particular bit together with transmits for all higher ordered bits. For instance, the AND circuit 4 reflects a carry into bit 27 together with transmits for bits 26, 25 and 24; the AND circuit 5 responds to a carry into bit 25 together with transmits for bits 25 and 24; and the AND circuit 7 responds to a carry into bit 24 together with a transmit for bit 24. Similarly, there is provided, for each of the four-bit groups in the adder (with the exception of the highest ordered group), an OR circuit to generate the carry out for that group in dependence upon proper combinations of carries the lowest-ordered bit of that group into a bit together with transmit functions to transmit the carry through the highest ordered bit of the group.

9.3.5.2 Half Sum Error Circuit FIG. 181

The half sum error circuit FIG. 181 comprises essentially an OR circuit 1 responsive to either one of three inverters 2–4 which in turn respond to corresponding ones of three EXCLUSIVE OR composites 5–7, each of which a carry propagate adder connected to said carry save adder for generating a final sum in response to said carry save sum and to said carry save carry; and means responsive to input operands, to said carry save adder, and to components of said carry propagate adder for checking the operation thereof.

8. The device described in claim 6, additionally comprising:

means responsive to input operands, to said carry save adder, and to components of said carry propagate adder for checking the operation thereof.

9. An adder for a data processing system, comprising:

input means for presenting operands to said adder, said operands to be combined within said adder;

a carry save adder responsive to said input means for generating carry save carries and carry save sums;

bit function means responsive to said carry save carry and to said carry save sum for producing bit generate functions and bit transmit functions in response thereto;

group function means responsive to said bit function means for producing group generate functions and transmit generate functions in response to said bit functions;

group carry means responsive to said group function means for generating carries into groups;

bit carry means responsive to said bit function means and to said group carry means for generating carries into bits;

final sum means directly responsive to said bit carry means and to said bit function means for generating a final sum;

half sum means responsive to said bit functions for generating half sums of said operands;

means responsive to said half sum means to generate an invert parity function;

means responsive to said bit functions to generate a signal indicating an odd carry effect in a group;

and means responsive to said last two means, and to inputs and parity inputs to said adder, and to group carries, to generate a parity for said final sum.

10. The device described in claim 9, additionally comprising:

means responsive to said half sums, and to parities of inputs to said bit function means for generating a half sum error in the event of a difference in the odd and even character thereof.

References Cited

UNITED STATES PATENTS

| | | | |
|---|---|---|---|
| 3,253,131 | 5/1966 | MacSorley et al. | 235—175 X |
| 3,342,983 | 9/1967 | Pitkowsky et al. | 235—153 |

EUGENE G. BOTZ, Primary Examiner

U.S. Cl. X.R.

235—153